(12) United States Patent
Kawano et al.

(10) Patent No.: US 10,506,124 B2
(45) Date of Patent: Dec. 10, 2019

(54) IMAGE READING APPARATUS

(71) Applicant: Mitsubishi Electric Corporation, Chiyoda-ku (JP)

(72) Inventors: Hiroyuki Kawano, Tokyo (JP); Shigeru Takushima, Tokyo (JP); Yoshitaka Toyoda, Tokyo (JP); Toru Aoki, Tokyo (JP); Tetsuo Funakura, Tokyo (JP); Taku Matsuzawa, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/094,398

(22) PCT Filed: Mar. 29, 2017

(86) PCT No.: PCT/JP2017/012948
§ 371 (c)(1),
(2) Date: Oct. 17, 2018

(87) PCT Pub. No.: WO2017/195487
PCT Pub. Date: Nov. 16, 2017

(65) Prior Publication Data
US 2019/0132470 A1    May 2, 2019

(30) Foreign Application Priority Data

May 13, 2016   (JP) .................................. 2016-097034

(51) Int. Cl.
H04N 1/04    (2006.01)
H04N 1/46    (2006.01)
(Continued)

(52) U.S. Cl.
CPC ......... *H04N 1/0306* (2013.01); *G02B 27/005* (2013.01); *H04N 1/02885* (2013.01); *H04N 1/401* (2013.01)

(58) Field of Classification Search
CPC .. H04N 1/0306; H04N 1/02885; H04N 1/401; G02B 27/005
(Continued)

(56) References Cited

U.S. PATENT DOCUMENTS 8,107,138 B2 *  1/2012  Minobe .............. H04N 1/02815
                                                                358/474
8,228,566 B2 *  7/2012  Kawano ............... H04N 1/0306
                                                                358/474
(Continued)

FOREIGN PATENT DOCUMENTS

JP      11-122440 A    4/1999
JP   2011-135484 A    7/2011
(Continued)

OTHER PUBLICATIONS

International Search Report dated Jul. 4, 2017, in PCT/JP2017/012948 filed Mar. 29, 2017.

*Primary Examiner* — Cheukfan Lee
(74) *Attorney, Agent, or Firm* — Oblon, McClelland, Maier & Neustadt, L.L.P.

(57) ABSTRACT

A plurality of image-forming optical elements are disposed such that a part of a field-of-view region of one image-forming optical element overlaps a part of a field-of-view region of an image-forming optical element disposed adjacent to the one image-forming optical element, each of the image-forming optical elements includes: a lens for collecting light scattered by a reading object; an aperture stop for cutting off some of the light collected by the lens; a phase modulating element for modulating phase of light passing through the aperture stop; and a lens for allowing the light (Continued)

whose phase is modulated by the phase modulating element to form an image on an image-forming surface, and the phase modulating elements are loaded such that resolution characteristics of the phase modulating elements in an arrangement direction of the image-forming optical elements are the same among the image-forming optical elements.

13 Claims, 16 Drawing Sheets

(51) Int. Cl.
    *H04N 1/03*           (2006.01)
    *G02B 27/00*         (2006.01)
    *H04N 1/028*        (2006.01)
    *H04N 1/401*        (2006.01)

(58) Field of Classification Search
    USPC ................................ 358/475, 509, 482, 513
    See application file for complete search history.

(56) References Cited

U.S. PATENT DOCUMENTS

| | | | |
|---|---|---|---|
| 8,345,325 B2* | 1/2013 | Schmidt | H04N 1/03 358/474 |
| 10,326,908 B2* | 6/2019 | Asamura | H04N 1/387 |
| 10,382,642 B2* | 8/2019 | Ohzawa | H04N 1/0315 |
| 2011/0038019 A1* | 2/2011 | Kawano | H04N 1/0306 358/475 |
| 2013/0155472 A1* | 6/2013 | Kawano | G03G 15/60 358/450 |
| 2018/0013919 A1 | 1/2018 | Asamura et al. | |
| 2018/0152580 A1* | 5/2018 | Murase | H04N 1/02885 |
| 2018/0152582 A1* | 5/2018 | Murase | H04N 1/02885 |
| 2018/0262638 A1* | 9/2018 | Ohzawa | H04N 1/0305 |

FOREIGN PATENT DOCUMENTS

| | | |
|---|---|---|
| JP | 2014-75653 A | 4/2014 |
| WO | WO 2016/147832 A1 | 9/2016 |

* cited by examiner

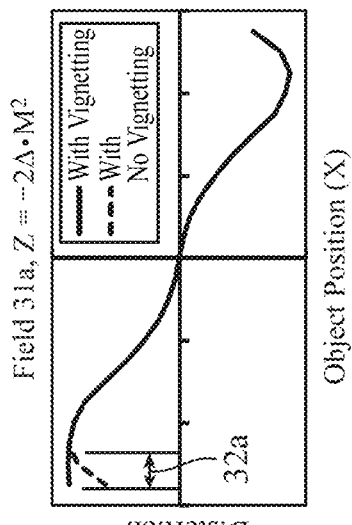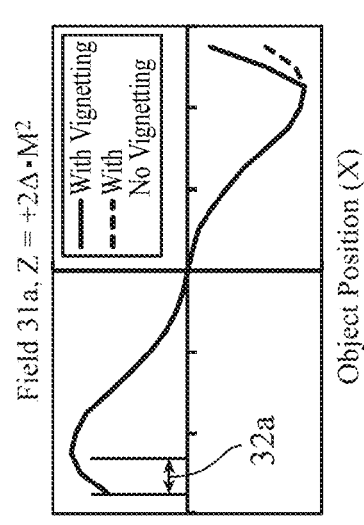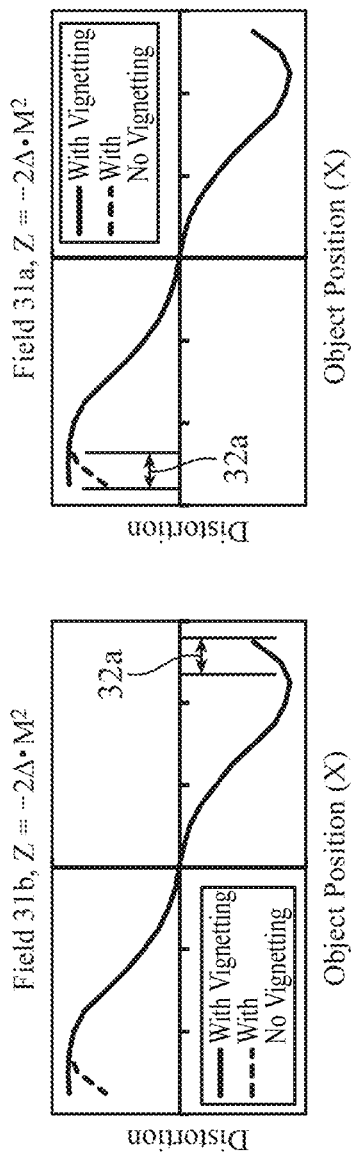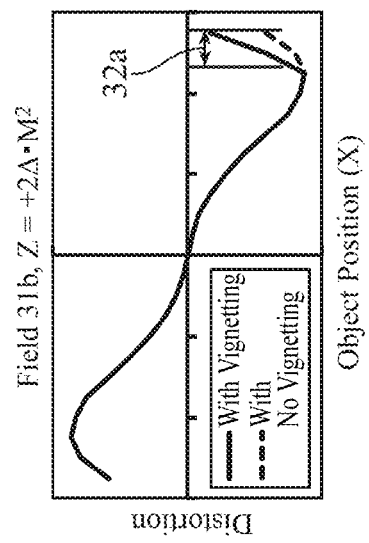

IMAGE READING APPARATUS

TECHNICAL FIELD

This disclosure relates image reading apparatuses for reading one or more images of a reading object.

BACKGROUND ART

In an image reading apparatus used in, for example, a copier, a bill reader, a scanner, a facsimile, etc., plural pairs of an image-forming lens and a linear image sensor are arranged in a main scanning direction.

Each image-forming lens of the image reading apparatus collects light scattered by a reading object which is moved in a sub-scanning direction, and captures the collected light on an image-forming surface of a corresponding linear image sensor, and thereby forms an image of the reading object on the image-forming surface.

The linear image sensor of the image reading apparatus reads the image formed by the image-forming lens.

The image-forming lenses arranged in the main scanning direction are disposed such that a part of a field-of-view region of one image-forming lens overlaps a part of a field-of-view region of an image-forming lens disposed adjacent to the one image-forming lens, and an image combining process for the images respectively read by the linear image sensors is performed, by which the images are overlapped. The field-of-view region is a region in which the light scattered by the reading object is collected.

CITATION LIST

Patent Literatures

Patent Literature 1: JP 11-122440 A

SUMMARY OF INVENTION

Technical Problem

Since the conventional image reading apparatus is configured in the above-described manner, miniaturization of optical systems can be achieved by disposing small image-forming lenses. However, when image-forming lenses made of an inexpensive plastic are used to reduce the cost of the image-forming lenses, there is a problem that chromatic aberration occurs, degrading an image to be obtained.

In general, to suppress chromatic aberration occurring in the image-forming lenses, glass materials having different refractive indices and different dispersions are combined, but with inexpensive plastic, correction of chromatic aberration is difficult, and thus, it is difficult to suppress chromatic aberration.

One or more embodiments of the present disclosure are made to solve a problem such as that described above, and an object of one or more embodiments in the present disclosure is to obtain an image reading apparatus capable of suppressing image degradation by suppressing chromatic aberration.

Solution to Problem

An image reading apparatus according to this disclosure includes: image-forming optical elements arranged in a straight line, each image-forming optical element for collecting light scattered by a reading object and capturing the collected light on an image-forming surface, and thereby forming an image of the reading object on the image-forming surface; and imaging elements, disposed on the image-forming surface, for reading respective images formed by the image-forming optical elements, wherein the image-forming optical elements are disposed such that a part of a field-of-view region of one image-forming optical element overlaps a part of a field-of-view region of an image-forming optical element disposed adjacent to the one image-forming optical element, the field-of-view region being a region in which the light scattered by the reading object is collected, each image-forming optical element includes: a lens for capturing the light scattered by the reading object on the image-forming surface; an aperture stop for cutting off part of light passing through the lens; and a phase modulating element for modulating phase of light passing through the aperture stop, the phase modulating element having resolution characteristics that depend on an angle around an optical axis, and the phase modulating elements are loaded such that resolution characteristics of the phase modulating elements in an arrangement direction of the image-forming optical elements are same among the image-forming optical elements.

Advantageous Effects of Invention

According to one or more embodiments in the present disclosure, since a configuration is such that the phase modulating elements are loaded such that the resolution characteristics of the phase modulating elements in an arrangement direction of the image-forming optical elements are the same among the image-forming optical elements, there is an advantageous effect that chromatic aberration is suppressed, enabling the suppression of image degradation.

BRIEF DESCRIPTION OF DRAWINGS

FIG. 23A is an illustrative diagram showing distortion in a field-of-view region 31$b$ for a case in which defocus $Z=-2\Delta M^2$ occurs on the reading object 1 side, FIG. 23B is an illustrative diagram showing distortion in a field-of-view region 31$a$ for the case in which defocus $Z=-2\Delta M^2$ occurs on the reading object side, FIG. 23C is an illustrative diagram showing distortion in the field-of-view region 31$b$ for a case in which defocus $Z=+2\Delta M^2$ occurs on the reading object 1 side, and FIG. 23D is an illustrative diagram showing distortion in the field-of-view region 31$a$ for when defocus $Z=+2\Delta M^2$ occurs on the reading object 1 side.

DESCRIPTION OF EMBODIMENTS

To describe this application in more detail, embodiments according to this disclosure will be described below with reference to the accompanying drawings.

Embodiment 1

Figure 1:
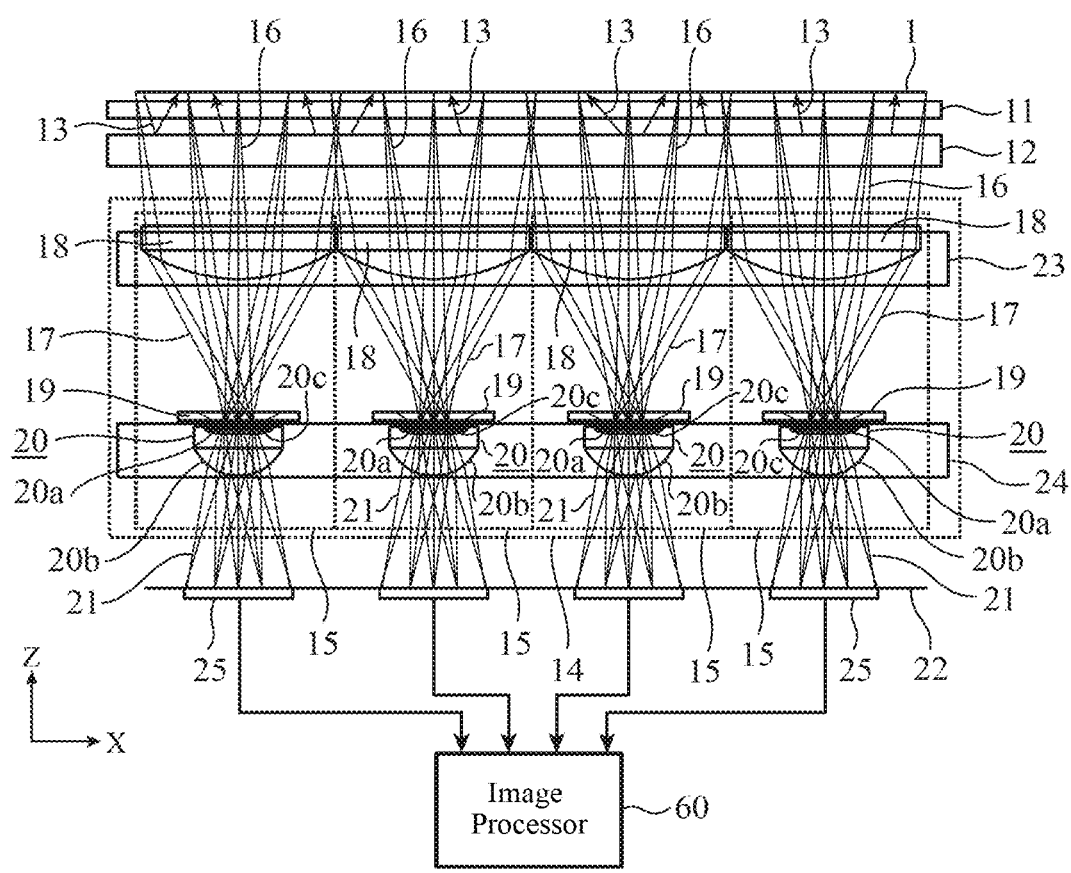
FIG. 1 is a cross-sectional view showing an image reading apparatus in accordance with Embodiment 1 of this application.
Figure 2:
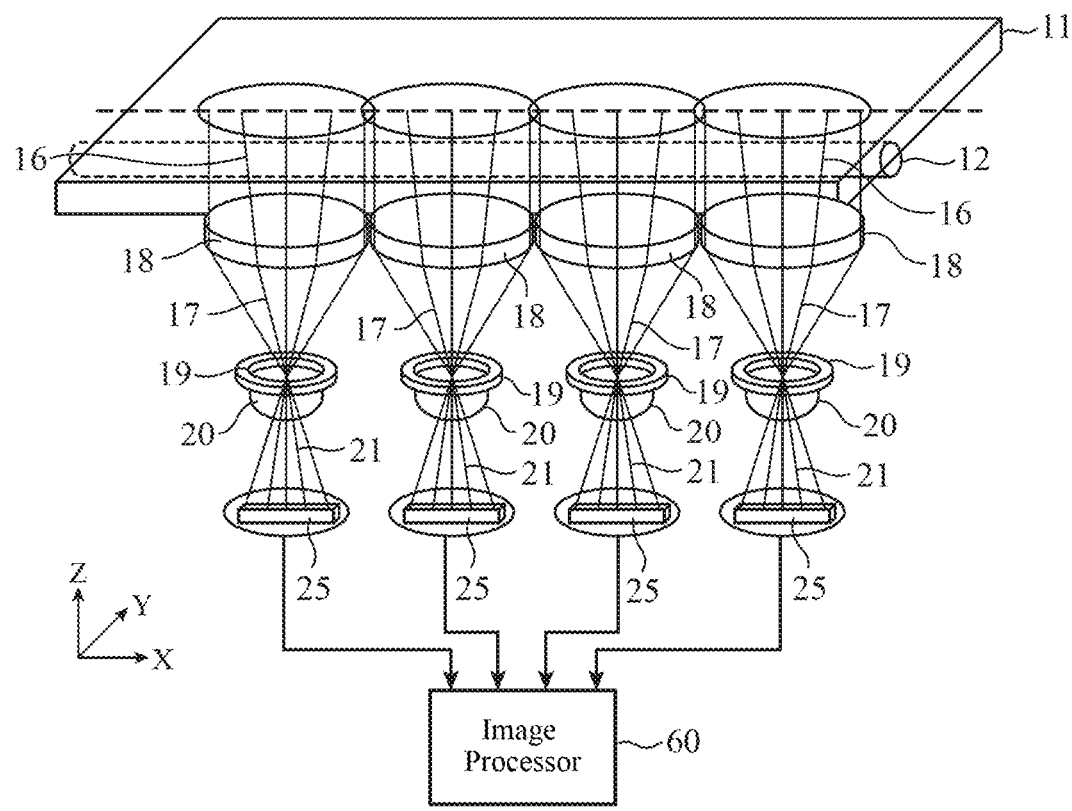
FIG. 2 is a perspective view showing the image reading apparatus of Embodiment 1 of this application.

FIG. 1 is a cross-sectional view showing an image reading apparatus in accordance with Embodiment 1 of this application, and FIG. 2 is a perspective view showing the image reading apparatus in accordance with Embodiment 1 of this application.

Although FIG. 1 is a cross-sectional view, hatching is not used in the drawing because use of hatching makes it difficult to see the details of the drawing.

In FIGS. 1 and 2, a reading object 1 is placed on a top glass 11 of the image reading apparatus. For example, in a scanner apparatus that scans a paper document or the like, which is the reading object 1, the reading object is moved over the top glass 11 in a sub-scanning direction which is a Y-direction in the drawing. In addition, in a business copier, the entire structure other than the top glass 11 shown in FIG. 1 is moved relative to the reading object 1 placed still on the top glass 11, in the sub-scanning direction which is the Y-direction in the drawing.

A light emitting unit 12 is a light source that emits light 13 toward the reading object 1.

An image-forming system array 14 includes image-forming optical elements 15.

The image-forming optical elements 15 each are arranged in a straight line. Namely, the image-forming optical elements 15 each are arranged in a main scanning direction, which is an X-direction in the drawing.

Although in the example of FIGS. 1 and 2 four image-forming optical elements 15 are arranged, this is merely an example, and two or three image-forming optical elements 15 or five or more image-forming optical elements 15 may be arranged.

The image-forming optical elements 15 are unit image-forming systems that are disposed in a line in the main scanning direction, and form, on an image-forming surface 22, reduced, transferred images of images of a surface of the reading object 1 by collecting light 16 scattered by the reading object 1 and imaging the collected light 17 on the image-forming surface 22.

In addition, though details will be described later, the image-forming optical elements 15 are disposed such that a part of a field-of-view region of one image-forming optical element 15 overlaps a part of a field-of-view region of an image-forming optical element 15 disposed adjacent to the one image-forming optical element 15. The field-of-view region is a region in which light 16 is collected.

Lenses 18 are first lenses that collect the light 16 scattered by the reading object 1.

Aperture stops 19 are optical parts that cut off some of the light 17 collected by the lenses 18.

Lenses 20 each have a first lens surface 20a on the aperture stop 19 side and a second lens surface 20b on the image-forming surface 22 side, and a phase modulating element 20c that modulates the phase of rays passing through the aperture stop 19 is placed on the first lens surface 20a. The phase modulating element 20c has resolution characteristics that depend on an angle around an optical axis.

The lenses 20 each are a second lens that images light 21 whose phase is modulated by a phase modulating element 20c on the image-forming surface 22.

Though details will be described later, the phase modulating elements 20c are loaded such that the resolution characteristics of the phase modulating elements 20c in an arrangement direction of the image-forming optical elements 15 are the same among the image-forming optical elements 15. Namely, the loading angles around the optical axes of the plurality of phase modulating elements 20c relative to the main scanning direction which is the X-direction are the same in the same plane.

In the example of FIG. 1 the image reading apparatus includes the lenses 18 and the lenses 20. However, because it is only required that the light 16 scattered by the reading object 1 is captured on the image-forming surface 22, the lenses 18 may have the function of the lenses 20 or the lenses 20 may have the function of the lenses 18.

A holder 23 is a holding member that holds the lenses 18 in the image-forming optical elements 15.

A holder 24 is a holding member that holds the lenses 20 in the image-forming optical elements 15.

Imaging elements 25 are linear-shaped chips disposed on the image-forming surface 22. Each of the imaging elements 25 reads a reduced, transferred image formed by a corresponding image-forming optical element 15, and outputs the read reduced, transferred image, as an image of the reading object 1, to an image processor 60.

The image processor 60 performs an image combining process for combining the reduced, transferred images that are respectively outputted from the imaging elements 25. By scanning the reading object 1 on the top glass 11 in the sub-scanning direction, which is the Y-direction, a two-dimensional image of the surface of the reading object 1 is obtained.

Figure 3:
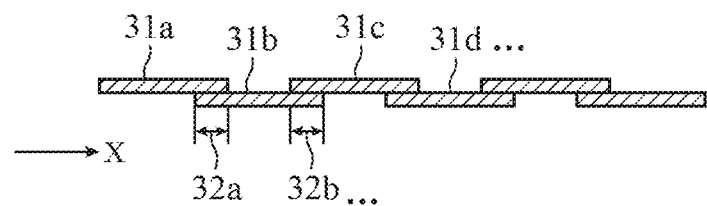
FIG. 3 is a schematic diagram showing field-of-view regions of a plurality of image-forming optical elements 15.

FIG. 3 is a schematic diagram showing the field-of-view regions of the image-forming optical elements 15.

In FIGS. 3, 31a, 31b, 31c, and 31d are the field-of-view regions of the image-forming optical elements 15. Although, in FIG. 3, in order that overlapping of the field-of-view regions can be easily seen, two (top and bottom) alternate layers are depicted on the paper, the field-of-view regions actually overlap each other in a straight line.

For example, taking a look at the field-of-view region 31b of an image-forming optical element 15 which is the second from the left in the drawing, a part 32a of the field-of-view region 31b overlaps a part of the field-of-view region 31a of an image-forming optical element 15 which is the first from the left, and a part 32b of the field-of-view region 31b of image-forming optical element 15 which is the second from the left overlaps a part of the field-of-view region 31c of an image-forming optical element 15 which is the third from the left.

The part 32a of the field-of-view region 31b that overlaps the field-of-view region 31a, and the part 32b of the field-of-view region 31b that overlaps the field-of-view region 31c are hereinafter referred to as overlapping regions.

For example, assuming that an image reading range by the image reading apparatus is 300 mm, that the image-forming optical elements 15 are disposed in 10 mm pitches in the X-direction, and that the range of the field-of-view regions 31a, 31b, 31c, 31d is . . . 11 mm, the range of the overlapping regions 32a, 32b is . . . 1 mm.

Next, operation will be described.

The light emitting unit 12 gives off light 13 toward the reading object 1 placed on the top glass 11.

The light 13 emitted from the light emitting unit 12 is scattered by the reading object 1. The light 16 scattered by the reading object 1 enters the image-forming optical elements 15.

The lenses 18 in the image-forming optical elements 15 collect the light 16 scattered by the reading object 1, and the aperture stops 19 in the image-forming optical elements 15 cut off some of the light 17 collected by the lenses 18.

The lenses 20 in the image-forming optical elements 15 capture the rays passing through the aperture stops 19 on the image-forming surface 22, and thereby form on the image-forming surface 22 the reduced, transferred images of images of the surface of the reading object 1.

Note, however, that since the phase modulating elements 20c are placed on the first lens surfaces 20a of the lenses 20, the phases of the rays passing through the aperture stops 19 are modulated by the phase modulating elements 20c. The operation of the phase modulating elements 20c will be described later.

The imaging elements 25 read the reduced, transferred images formed by the image-forming optical elements 15, and output the read reduced, transferred images to the image processor 60.

When the image processor 60 receives the reduced, transferred images from the imaging elements 25, the image processor 60 performs an image combining process on the reduced, transferred images, and thereby overlaps the reduced, transferred images. By scanning the reading object 1 on the top glass 11 in the sub-scanning direction, which is the Y-direction, a two-dimensional image of the surface of the reading object 1 is obtained.

In Embodiment 1, the phase modulating elements 20c are placed on the first lens surfaces 20a of the lenses 20. When the phase modulating elements 20c are not loaded, it is difficult to suppress chromatic aberration occurring in the image-forming optical elements 15, and thus, it is difficult to suppress image degradation.

Image degradation occurring when the phase modulating elements 20c are not loaded will be specifically described below.

Here, it is assumed that the lens 20 does not have the first lens surface 20a such that the phase modulating element 20c is placed thereon, but has only the second lens surface 20b.

As general means for correcting chromatic aberration occurring in a refractive lens system such as the lens 20, there is known means that uses an achromatic lens.

The achromatic lens is a lens in which a convex lens made of a glass material with low dispersion and a concave lens made of a glass material with high dispersion are bonded together. Note, however, that manufacturing costs for bonded lenses with different materials are high.

Although manufacturing a achromatic lens using plastic reduces manufacturing costs, the use of plastic makes it difficult to suppress chromatic aberration because correction of chromatic aberration is difficult.

Figure 4:
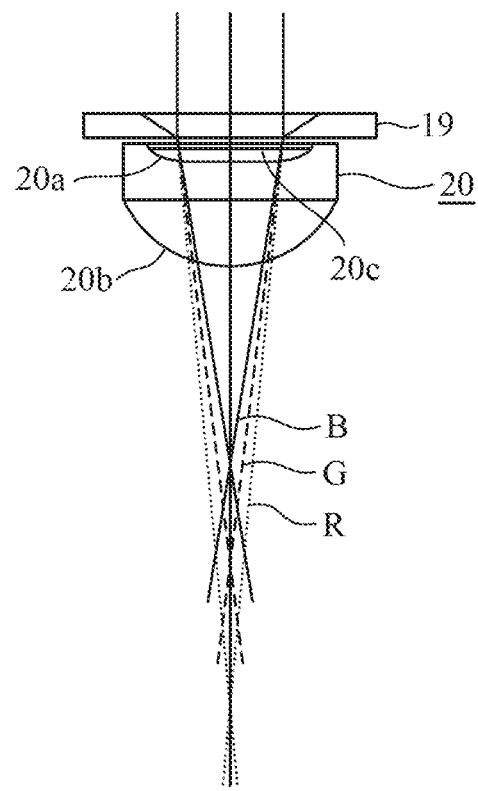
FIG. 4 is an illustrative diagram showing axial chromatic aberration occurring in a refractive lens system.

FIG. 4 is an illustrative diagram showing axial chromatic aberration occurring in a refractive lens system. The axial chromatic aberration is aberration in which the focus position varies between different wavelengths.

In FIG. 4, B indicates converging blue light rays in the light passing through the aperture stop 19 and the lens 20, and forms an image at a position close to the lens 20.

G indicates converging green light rays, and forms an image at a position farther from the lens 20 than the converging blue light rays B.

R indicates converging red light rays, and forms an image at a position farther from the lens 20 than the converging green light rays G.

Figure 5:
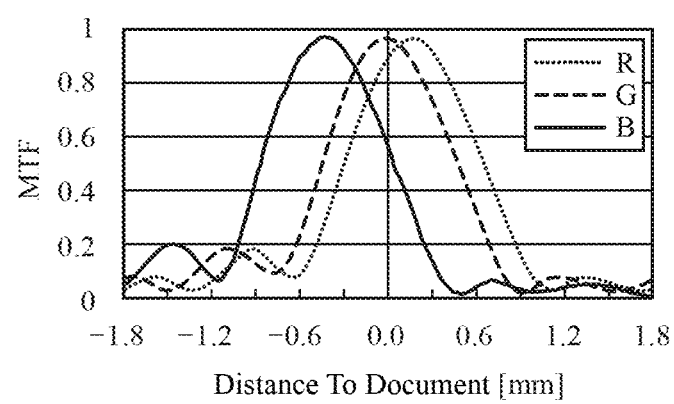
FIG. 5 is a graph showing MTFs with respect to the distance to document for a case in which a phase modulating element 20c is not loaded.

FIG. 5 shows modulation transfer function (MTF) graphs with respect to the distance to document in a case in which the phase modulating element 20c is not loaded.

Here, the MTF is a transfer function of an optical system.

The reading object 1 which is an object targeted by the optical system varies in pattern and size, but can be considered as a collection of patterns ranging from a rough bright and dark pattern to a detailed bright and dark pattern. The MTF is a parameter for describing how faithfully contrast which is these bright and dark patterns can be reproduced in an image.

FIG. 5 shows MTFs for a spatial frequency equivalent to 380 dpi, and the distance to document on a horizontal axis is the distance to the reading object 1 with reference to a just focused position. The MTF on a vertical axis is shown for each R, G, B color.

Note that measurement of the MTF generally uses a sine-wave chart in which the light transmittance changes from 100% to 0% in a sine curve manner, and the number of peaks of the sine wave present in 1 mm called a spatial frequency.

In FIG. 5, the color R with a long wavelength has its peak in a position of +0.15 mm, whereas the color B with a short wavelength has its peak in a position of −0.45 mm.

Hence, when a black and white document with a high spatial frequency is placed in a position of +0.15 mm, red components are formed into an image without any blur, but blue components are blurred, resulting in an image with reddish white lines.

In addition, when a black and white document with a high spatial frequency is placed in a position of −0.45 mm, blue components are formed into an image without any blur, but red components are blurred, resulting in an image with bluish white lines.

Therefore, it can be seen that, when the phase modulating element 20c is not loaded, image degradation occurs, e.g., due to the fineness of patterns of an object, color looks blurred.

There is known a technique called wavefront coding (hereinafter, referred to as "WFC") for suppressing image degradation by mounting the phase modulating element 20c, and this technique is disclosed in, for example, the following Patent Literature 2:

[Patent Literature 2] JP 2011-135484 A

The WFC is a technique in which the phase modulating element 20c that modulates the phase of transmitted light is placed at or near an aperture stop, and in which image processing is performed on an image read by an imaging element to reconstruct an image.

For phase modulation provided by the phase modulating element 20c, for example, phase modulation provided by a cubic phase-modulation function such as that shown in Equation (1) below is conceivable:

$$\phi(X,Y)=a(X^3+Y^3) \qquad (1)$$

In Eq. (1), a is a constant. X is the position in the main scanning direction and Y is the position in the sub-scanning direction. Note, however, that this is an example and thus phase modulations in accordance with other functional forms are also conceivable.

For the phase modulating element 20c, a plate member made of transparent material, such as glass or plastic, and the plate member is processed such that a thickness Z thereof changes in accordance with the position (X, Y) in a plane, as shown in Equation (2) below:

$$Z=\phi(X,Y) \qquad (2)$$

Figure 6:
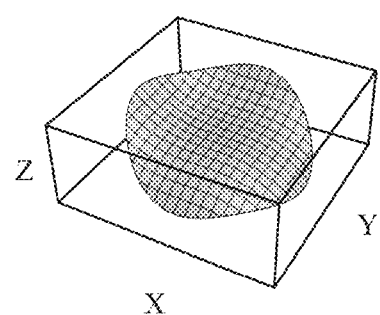
FIG. 6 is an illustrative diagram showing a phase modulation function.

A result of three-dimensional plotting of the function shown in Eq. (2) is as shown in FIG. 6. FIG. 6 is an illustrative diagram showing a phase modulation function which is the function shown in Eq. (2).

By mounting the phase modulating element 20c, collected rays are distorted as shown in FIG. 7.

Figure 7A:
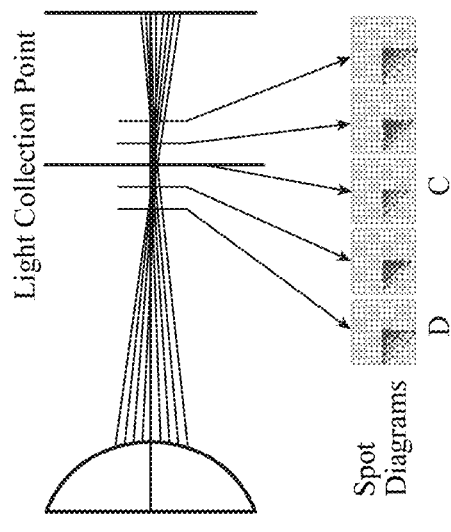
FIG. 7A is an illustrative diagram showing collected rays for the case in which the phase modulating element 20c is not loaded, and spot diagrams at and near a position where the rays are collected.

FIG. 7A illustrates collected rays for the case in which the phase modulating element 20c is not loaded, and also spot diagrams at and near a position where the rays are collected.

Figure 7B:
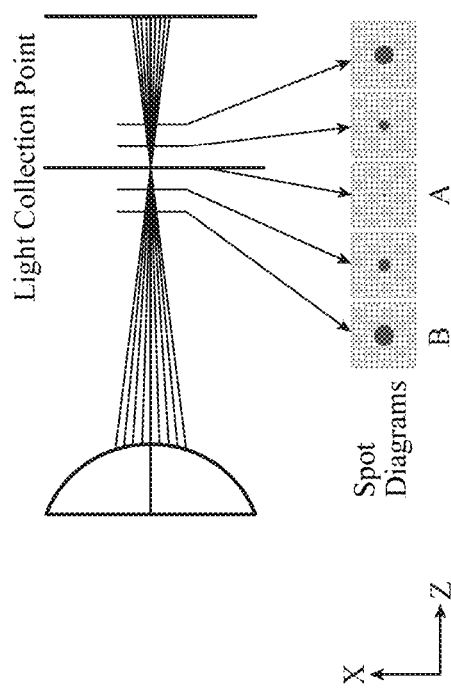
FIG. 7B is an illustrative diagram showing collected rays for a case in which the phase modulating element 20c is loaded, and spot diagrams at and near a position where the rays are collected.

FIG. 7B illustrates collected rays for the case in which the phase modulating element 20c is loaded, and also spot diagrams at and near a position where the rays are collected.

When the phase modulating element 20c is not loaded, as shown in FIG. 7A, the size of a collected light spot changes greatly according to defocus from the focal point, and at the light collection point a small spot is obtained, but by defocusing a bit a large spot is obtained.

By contrast, when the phase modulating element 20c is loaded, as shown in FIG. 7B, a spot at a light collection point is also large and has an asymmetrically distorted shape, but substantially identical spots can be obtained regardless of the position in a Z-direction.

Figure 8:
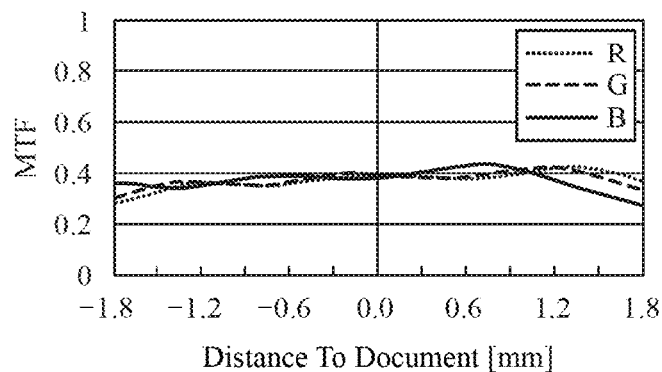
FIG. 8 is a graph showing MTFs with respect to the distance to document for when the phase modulating element 20c is loaded.

FIG. 8 is a graph diagram showing MTFs with respect to the distance to document for the case in which the phase modulating element 20c is loaded.

As in FIG. 5, FIG. 8 also shows the MTFs for a spatial frequency equivalent to 380 dpi.

Comparison of FIGS. 5 and 8 shows that, in the case where the phase modulating element 20c is loaded, although peak values are small, MTF values are substantially constant against the change in the distance to document.

Therefore, an image obtained when the phase modulating element 20c is loaded is blurred in the same manner regardless of the position in the Z-direction, and thus, even if the amount of shift in the Z-direction is not known, an image reconstructing process can be performed using the same deconvolution filter. The image reconstructing process is disclosed in, for example, Patent Literature 3 below:

[Patent Literature 3] JP 2014-75653 A

In addition, a point spread function (hereinafter, referred to as "PSF") which is obtained using the function shown in Eq. (1) has various spatial frequency components. The PSF is an abbreviation for "Point Spread Function".

FIG. 9 depicts illustrative diagrams showing MTFs in the X-direction for spots A to D in FIG. 7.

Figure 9A:
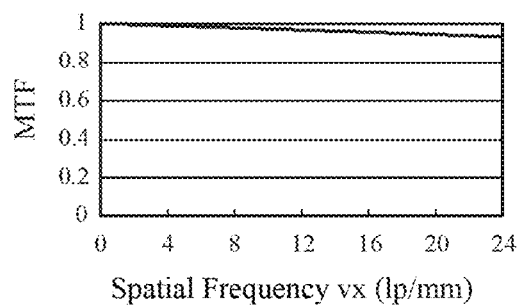
FIG. 9A is an illustrative diagram showing an MTF in an X-direction for a spot A.
Figure 9B:
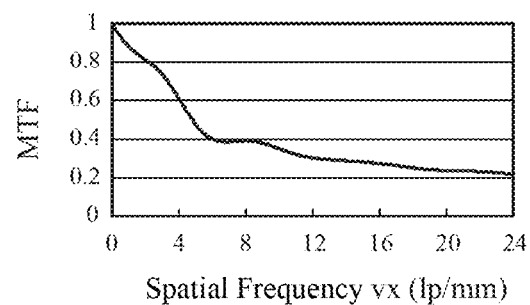
FIG. 9B is an illustrative diagram showing an MTF in the X-direction for a spot B.

FIG. 9A is an illustrative diagram showing an MTF in the X-direction for the spot A. FIG. 9B is an illustrative diagram showing an MTF in the X-direction for the spot B.

Figure 9C:
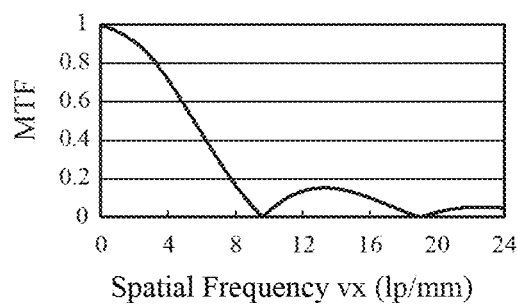
FIG. 9C is an illustrative diagram showing an MTF in the X-direction for a spot C.
Figure 9D:
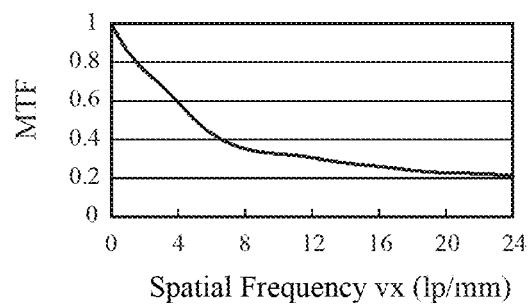
FIG. 9D is an illustrative diagram showing an MTF in the X-direction for a spot D.

In addition, FIG. 9C is an illustrative diagram showing an MTF in the X-direction for the spot C, and FIG. 9D is an illustrative diagram showing an MTF in the X-direction for the spot D.

For the spot A obtained in the case where the phase modulating element 20c is not loaded, as shown in FIG. 9A, the MTF has a large value over a wide spatial frequency range, and at the spot A an image with no blur is obtained.

For the spot B obtained in the case where the phase modulating element 20c is not loaded, as shown in FIG. 9B, since the MTF has a zero value at two spatial frequencies, at the spot B some pieces of image information in spatial frequency are lost, and thus, an image reconstructing process using a deconvolution filter cannot be performed.

For the spots C and D obtained in the case where the phase modulating element 20c is loaded, since the MTF does not have a zero value over a wide spatial frequency range, an image reconstructing process using a deconvolution filter can be performed.

FIG. 9C showing the MTF in the X-direction for the spot C and FIG. 9D showing the MTF in the X-direction for the spot D are almost the same graph, and there is an advantage in that the same deconvolution filter can be used regardless of the distance in the Z-direction.

Note that the phase modulating element 20c needs to be loaded in the plane of aperture stop so as to add the same modulation to point images at all image heights, which are positions in the X-direction. In addition, when there is a lens surface near the aperture stop, adding the thickness Z, which is an amount of sag represented by Eq. (2), to the shape of the lens curved surface provides the same phase modulation effect.

Appling the WFC technique in this manner extends the depth of field of each of R, G, and B for each image-forming optical element 15, which is a unit image-forming system, and therefore differences in resolution for R, G, and B can be ignored and axial chromatic aberration is eliminated in practice. In addition, not only the elimination of axial chromatic aberration, but also a great advantageous effect that the depth of field can be increased over the case of not applying the WFC technique can be obtained.

Next, a problem occurring when the WFC is applied to a compound-eye optical system will be described.

When the WFC is applied to a linear image sensor of a compound-eye optical system scheme, due to the PSF having an asymmetric shape, a problem occurs when images formed by the image-forming optical elements 15, unit image-forming systems, are joined together.

Since the PSF has an asymmetric shape, the resolution of an image formed by the image-forming optical element 15 having the phase modulating element 20c loaded thereon varies greatly depending on the direction.

Figure 10:
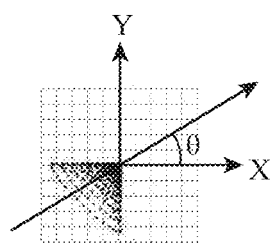
FIG. 10 is an illustrative diagram that defines directions used in computing the MTF.

FIG. 10 is an illustrative diagram that defines directions used when the MTF is computed.

In FIG. 10, θ is an angle from the X-direction.

Figure 11:
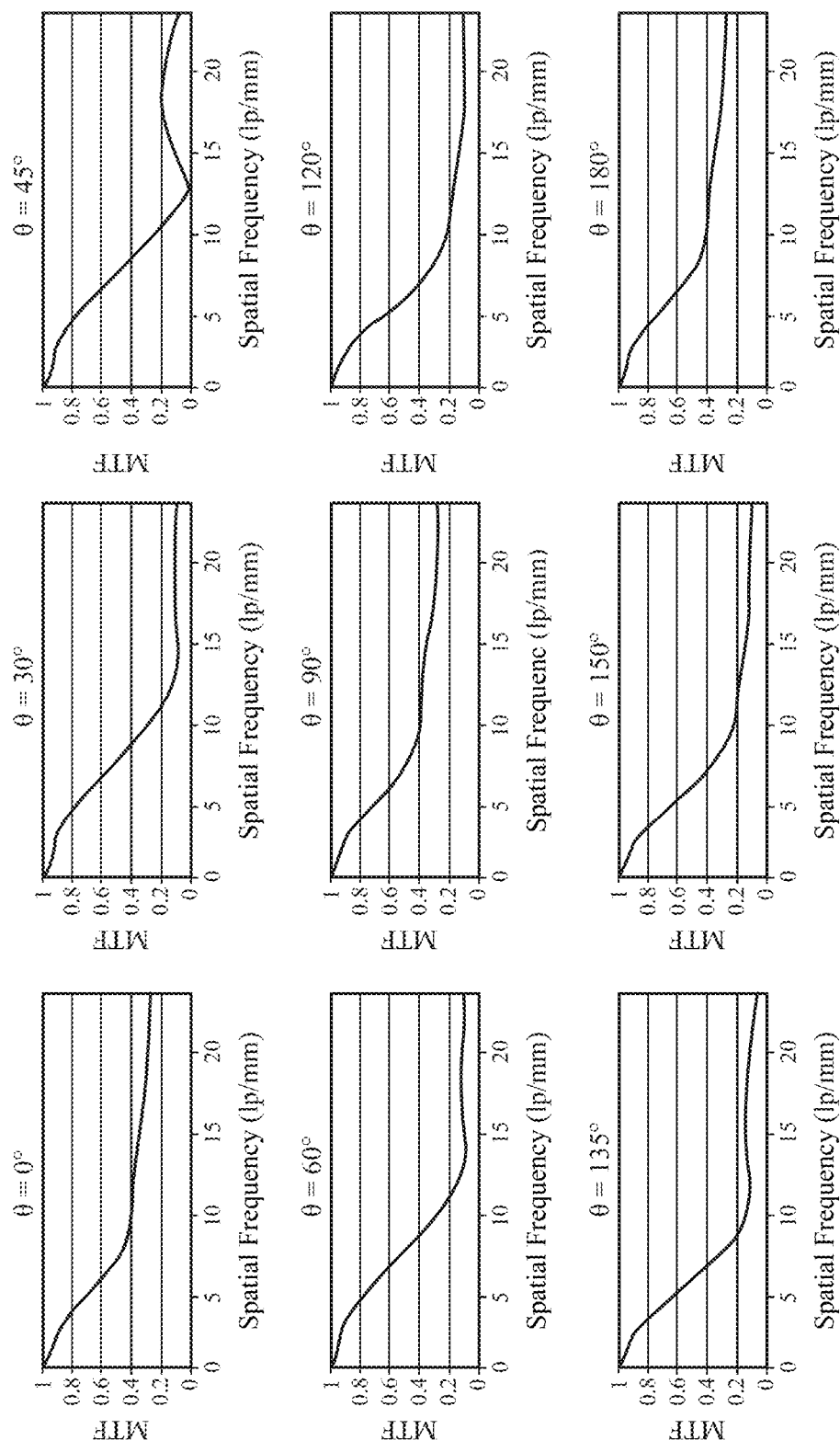
FIG. 11 is illustrative diagrams showing the results of computation of MTFs for the case in which the angle θ is 0°, 30°, 45°, 60°, 90°, 120°, 135°, 150°, and 180°.

FIG. 11 is an illustrative diagram showing the results of computation of MTFs for cases in which the angle θ is 0°, 30°, 45°, 60°, 90°, 120°, 135°, 150°, and 180°.

As shown in FIG. 11, the waveform of the MTF varies depending on the angle θ. Namely, the waveform of the MTF in the X-direction obtained when the phase modulating element 20c is rotated by an angle ϕ=−θ in an XY-plane is the MTF in an angular θ direction in FIG. 11. Hence, unless the same loading angle is set between the image-forming optical elements 15, images with different resolution directions are joined together. As a result, at boundaries where the images are joined together, significant image degradation occurs, such as the occurrence of discontinuous changes in resolution.

When discontinuous changes in resolution occur in images formed by the image-forming optical elements 15, even if an image reconstructing process using a deconvolution filter is performed on the images, the directional dependence of resolution remains.

In addition, depending on the orientation of the phase modulating element 20c, ringing that does not exist in an original image may occur by performing an image reconstructing process. Due to this, when the degree of occurrence of ringing varies depending on the orientation of the phase modulating element 20c, a degraded, joined image that is not suitable for appreciation may be obtained.

Hence, in Embodiment 1, by setting the loading angles around the optical axes of the phase modulating elements 20c included in all image-forming optical elements 15 to be the same angle θ in the same plane, characteristics that depend on the loading angles around the optical axes of the phase modulating elements 20c are made identical. In other words, the phase modulating elements 20c are installed such that the resolution characteristics of the phase modulating elements 20c, in an arrangement direction of the image-forming optical elements 15, are the same among the image-forming optical elements 15.

Specifically, the orientations of the lenses 20, each having the phase modulating element 20c placed on the first lens surface 20a, are all set to be in the same direction.

FIG. 12 is illustrative diagrams showing the lenses whose orientations are all set to be in the same direction.

In FIG. 12, 40 indicates global coordinates, and 41a, 41b, 41c, 41d, 41e, and 41f indicate local coordinates of phase superposition planes of the lenses 20 whose phase modulation is represented by Eq. (1). The phase superposition planes refer to the first lens surfaces 20a on which the phase modulating elements 20c are placed.

Figure 12A:
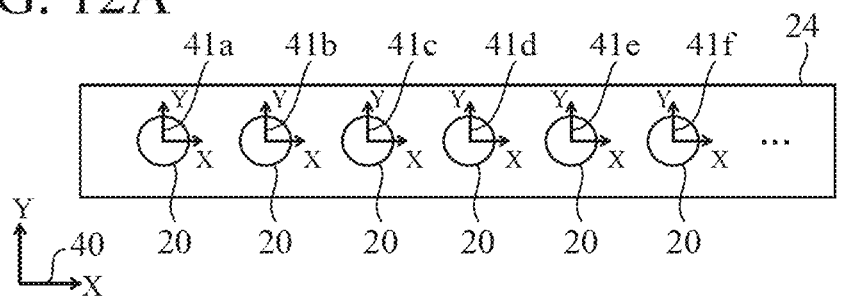
FIG. 12A is an illustrative diagram showing an example in which global coordinates 40 and local coordinates 41$a$, 41$b$, 41$c$, 41$d$, 41$e$, and 41$f$ of phase superposition planes of all lenses 20 have the same orientation.

FIG. 12A is an illustrative diagram showing an example in which the global coordinates 40 and the local coordinates 41a, 41b41, c, 41d, 41e, and 41f of the phase superposition planes of all lenses 20 have the same orientation.

In the example of FIG. 12A, because the image-forming optical elements 15 all have the same directional dependence of resolution, the problem occurring when images formed by the image-forming optical elements 15 are joined together is resolved.

Figure 12B:
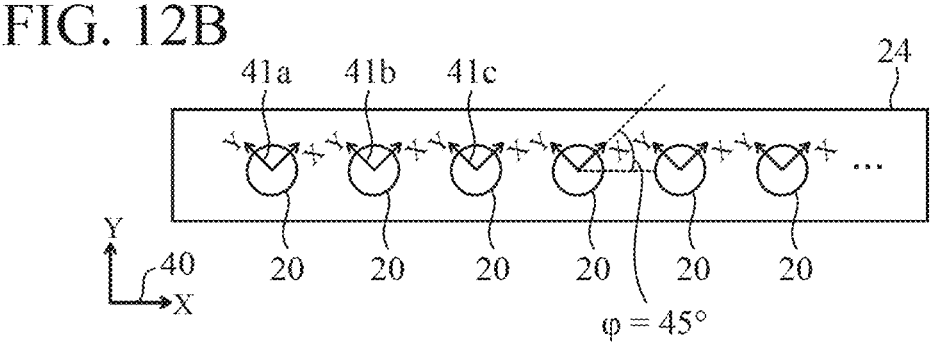
FIG. 12B is an illustrative diagram showing an example in which the local coordinates 41$a$, 41$b$, 41$c$, 41$d$, 41$e$, and 41$f$ of the phase superposition planes of all lenses 20 are rotated by 45°.

FIG. 12B is an illustrative diagram showing an example in which the local coordinates 41a, 41b, 41c, 41d, 41e, and 41f of the phase superposition planes of all lenses 20 are rotated by ϕ=45°, but the local coordinates 41a, 41b, 41c, 41d, 41e, and 41f of the phase superposition planes of all lenses 20 have the same orientation.

Figure 12C:
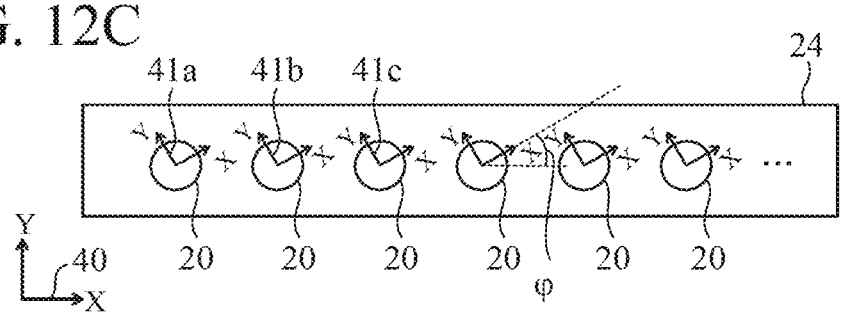
FIG. 12C is an illustrative diagram showing an example in which the local coordinates 41$a$, 41$b$, 41$c$, 41$d$, 41$e$, and 41$f$ of the phase superposition planes of all lenses 20 are rotated by θ.

FIG. 12C is an illustrative diagram showing an example in which the local coordinates 41a, 41b, 41c, 41d, 41e, and 4.1f of the phase superposition planes of all lenses 20 are rotated by θ, but the local coordinates 41a, 41b, 41c, 41d, 41e, and 41f of the phase superposition planes of all lenses 20 have the same orientation.

In the examples of FIGS. 12B and 12C, although the orientations of the local coordinates 41a, 41b, 41c, 41d, 41e, and 41f of the phase superposition planes of all lenses 20 differ from the orientation of the global coordinates 40, when the waveform of the MTF at the angle θ such as that shown in FIG. 11 is defined by Equation (3) below, because the MTF is a value indicating how much each spatial frequency component is contained at the angle θ, even if the angle θ is changed by 180°, the MTF has the same value. Namely, Equation (4) below holds true:

$$MTF = f(\theta) \quad (3)$$

$$f(\theta) = f(\theta + 180°) \quad (4)$$

Therefore, even if the local coordinates 41a, 41b, 41c, 41d, 41e, and 41f of the phase superposition planes of all lenses 20 are rotated by φ, the MTF matches between the +X-direction and −X-direction of the global coordinates.

Hence, even if the local coordinates 41a, 41b, 41c, 41d, 41e, and 41f of the phase superposition planes of all lenses 20 are rotated by φ, the directivity of image resolution matches among all image-forming optical elements 15. Needless to say, the rotation by φ also includes a rotation by φ=45°.

Note that as means for setting the same orientation for the local coordinates 41a, 41b, 41c, 41d, 41e, and 41f of the phase superposition planes of the lenses 20, means for making a cut in a part of each of the lenses 20 or in a part of each of the phase modulating elements 20c placed on the first lens surfaces 20a of the lenses 20 is conceivable.

Figure 13:
FIG. 13 is an illustrative diagram showing an example in which a part of the lens 20 is cut.

FIG. 13 is an illustrative diagram showing an example in which a cut is made in a part of the lens 20.

In the example of FIG. 13, the lens 20 that is partially cut in D-shape is shown, and fitting portions 50 of the holder 24 for the lenses 20 have a D-shape. By changing the shape or size of the cut, the magnitude of rotation can be changed.

When a part of each of the phase modulating elements 20c placed on the first lens surfaces 20a of the lenses 20 is cut, too, by changing the shape or size of the cut, the magnitude of rotation can be changed.

As is clear from the above, according to Embodiment 1, since a configuration is such that the phase modulating elements 20c are installed so as to have identical characteristics that depend on the loading angles around the optical axes of the phase modulating elements 20c included in the image-forming optical elements 15, an advantageous effect is provided that chromatic aberration is suppressed, enabling the suppression of image degradation.

Namely, since a configuration is such that the phase modulation characteristics of all phase modulating elements 20c are made identical by setting the loading angles around the optical axes of the phase modulating elements 20c included in all image-forming optical elements 15 to be the same angle θ in the same plane, the WFC can be applied to linear image sensors of compound-eye optical system type. As a result, an excellent image whose axial chromatic aberration is corrected can be obtained, and the depth of field can greatly improve.

Embodiment 2

Although Embodiment 1 above shows that the loading angles around the optical axes of the phase modulating elements 20c included in all image-forming optical elements 15 are set to be the same angle φ in the same plane, Embodiment 2 describes that the difference between the loading angles around the optical axes in the same plane of the phase modulating elements 20c included in the image-forming optical elements 15 is an integer multiple of 90 degrees.

FIG. 14 shows illustrative diagrams depicting examples in which the orientations of the lenses 20 having the phase modulating elements 20c loaded thereon differ therebetween by an integer multiple of 90 degrees.

In FIG. 14, the lenses 20 in which the angle of rotation of the local coordinates with respect to the global coordinates 40 is any of 0°, 90°, 180°, and 270° are disposed.

Where the phase modulation function is represented as shown in Eq. (1) above, due to the fact that even if an X-coordinate and a Y-coordinate are switched, the function expression is the same and that, as shown in Eq. (4), even if the angle θ is changed by 180°, the MTF has the same value, the waveform of the MTF in the angular θ direction is the same for θ=0°, 90°, 180°, and 270°. Namely, Equation (5) below holds true:

$$f(0°) = f(90°) = f(180°) = f(270°) \quad (5)$$

Thus, even if the lenses 20 are rotated by φ=0°, 90°, 180°, and 270°, because the directional dependence of the MTF does not change, excellent joining of images is possible.

Figure 14A:
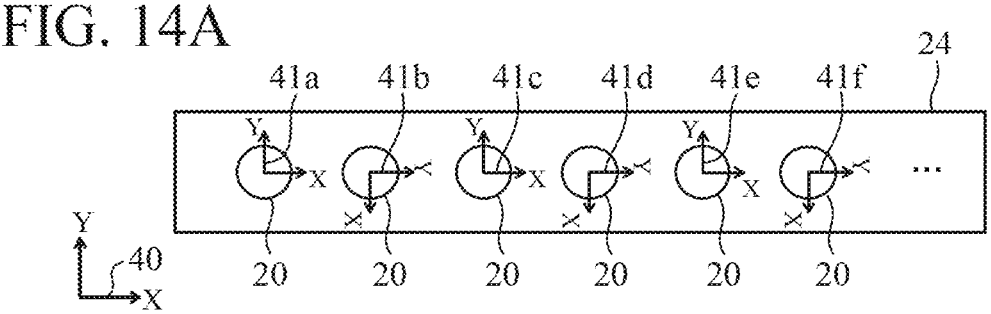
FIG. 14A is an illustrative diagram showing an example in which a lens 20 with θ=0° and a lens 20 with θ=270° are alternately disposed.

FIG. 14A is an illustrative diagram showing an example in which a lens 20 with φ=0° and a lens 20 with φ=270° are alternately disposed.

In the disposition of FIG. 14A, the MTFs of all image-forming optical elements 15 are exactly the same for the X-direction and Y-direction of the global coordinates 40. Thus, when the image processor 60 combines images formed by the image-forming optical elements 15, because the resolution directivities of all images match, excellent overlapping of the images can be performed.

Figure 14B:
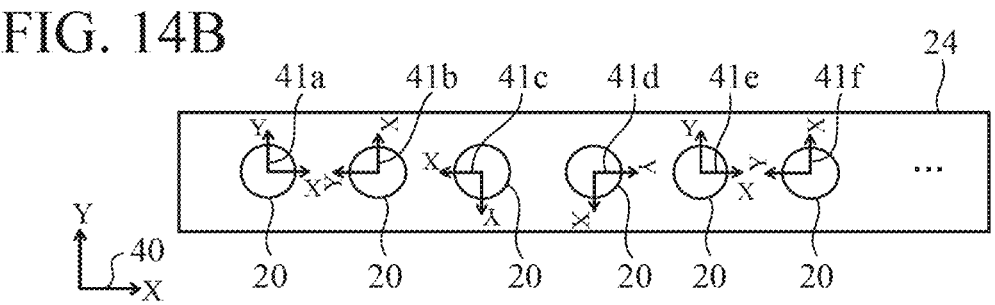
FIG. 14B is an illustrative diagram showing an example in which a lens 20 with θ=0°, a lens 20 with θ=90°, a lens 20 with θ=180°, and a lens 20 with θ=270° are disposed in this order from the left in the drawing.

FIG. 14B is an illustrative diagram showing an example in which a lens 20 with φ=0°, a lens 20 with φ=90°, a lens 20 with φ=180°, and a lens 20 with φ=270° are disposed in this order from the left in the drawing.

Figure 14C:
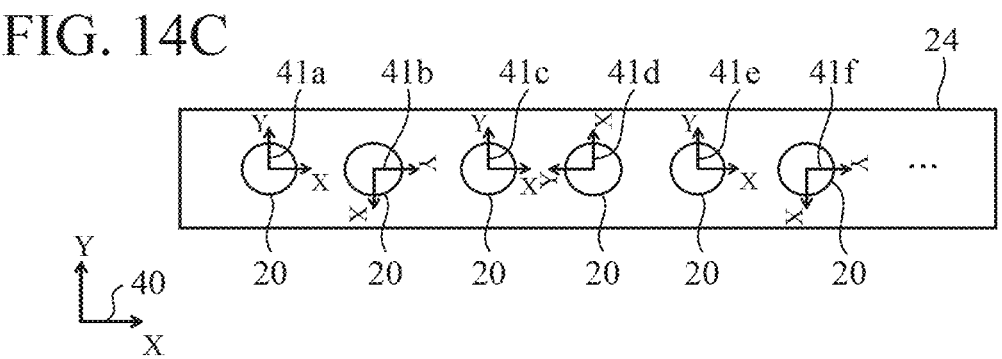
FIG. 14C is an illustrative diagram showing an example in which a lens 20 with θ=0°, a lens 20 with θ=90°, a lens 20 with θ=180°, and a lens 20 with θ=270° are randomly disposed.

FIG. 14C is an illustrative diagram showing an example in which a lens 20 with φ=0°, a lens 20 with φ=90°, a lens 20 with φ=180°, and a lens 20 with φ=270° are randomly disposed.

As in the case of FIG. 14A, in the case of FIGS. 14B and 14C, too, the MTFs of all image-forming optical elements 15 are exactly the same for the X-direction and Y-direction of the global coordinates 40. Thus, when the image processor 60 combines images formed by the image-forming optical elements 15, because the resolution directivities of all images match, excellent overlapping of the images can be performed.

Figure 14D:
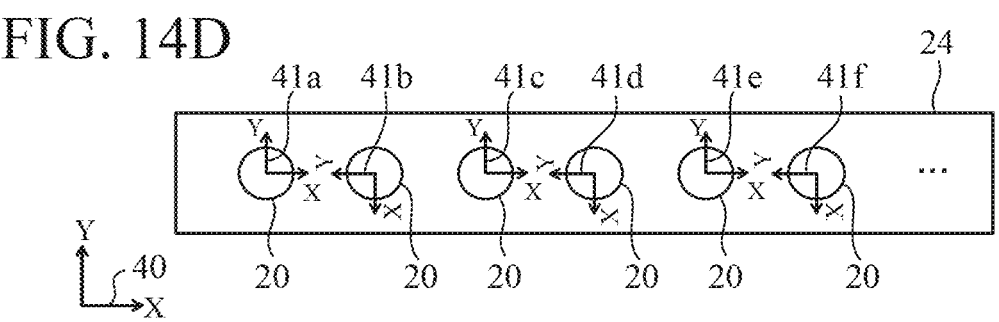
FIG. 14D is an illustrative diagram showing an example in which a lens 20 including a first phase modulating element 20$c$ whose loading angle around an optical axis has a first direction and a lens 20 including a second phase modulating element 20$c$ whose loading angle around an optical axis has a second direction are alternately disposed.

FIG. 14D is an illustrative diagram showing an example in which a lens 20 including a first phase modulating element whose loading angle around an optical axis has a first direction and a lens 20 including a second phase modulating element whose loading angle around an optical axis has a second direction are alternately disposed.

The first direction is a direction defined by local coordinates 41a, 41c, and 41e, a first coordinate axis for the first direction is an X-direction of the local coordinates 41a, 41c, and 41e, and a second coordinate axis for the first direction is a Y-direction of the local coordinates 41a, 41c, and 41e.

In addition, the second direction is a direction defined by local coordinates 41b, 41d, and 41f, a first coordinate axis for the second direction is an X-direction of the local coordinates 41b, 41d, and 41f, and a second coordinate axis for the second direction is a Y-direction of the local coordinates 41b, 41d, and 41f.

Therefore, the direction of the first coordinate axis for the second direction is a direction rotated by −90 degrees with respect to the first coordinate axis for the first direction, and the direction of the second coordinate axis for the second direction is a direction rotated by +90 degrees with respect to the second coordinate axis for the first direction.

As in the case of FIG. 14A, in the case of FIG. 14D, too, the directional dependences of MTFs match, and in addition, an advantageous effect such as that shown below can be obtained.

When the PSF is distorted by the phase modulating element 20c by applying the WFC, not only spot distortion, but also asymmetric distortion of the entire image occurs.

FIG. 15 is illustrative diagrams showing asymmetric distortion caused by the WFC.

Figure 15A:
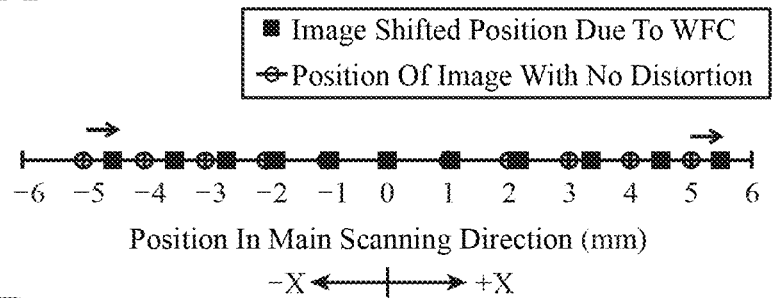
FIG. 15A is an illustrative diagram showing the positions of images with no distortion and image shifted positions due to the WFC.

FIG. 15A shows the positions of images with no distortion and positions in which images are shifted due to the WFC.

In FIG. 15A, the symbol "○" indicates the position of an image with no distortion, and the symbol "■" indicates a position in which an image is shifted due to the WFC.

Images in +X positions are shifted in a more positive direction, and images in −X positions are also shifted in the positive direction.

Figure 15B:
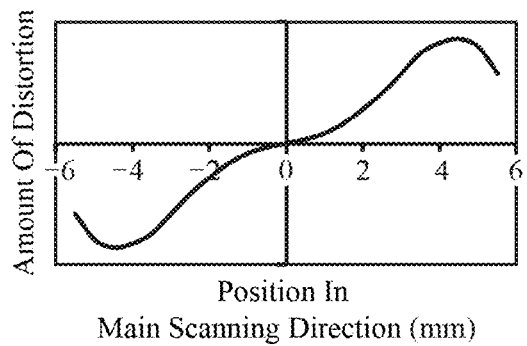
FIG. 15B is an illustrative diagram showing the amounts of distortion for respective positions in a main scanning direction.

When the amounts of shift in FIG. 15A are represented as the amounts of distortion in a graph with the amount of distortion obtained when an image is shifted in a direction away from a central position X=0 being a + direction, FIG. 15B is obtained. FIG. 15B is an illustrative diagram showing the amounts of distortion for respective positions in the main scanning direction.

As shown in FIG. 15B, left-right asymmetric image distortion occurs. Namely, in an image formed by a single image-forming optical element 15, the transfer magnification differs between the positive and negative directions of the main scanning direction.

When, with such distortion present, a given image-forming optical element 15 and its adjacent image-forming optical element 15 are oriented in the same direction as in Embodiment 1 above, even if an image in an overlapping region of the adjacent image-forming optical element 15 is attempted to be superimposed, since the transfer magnification is different, it is difficult to perform superimposition.

Figure 16:
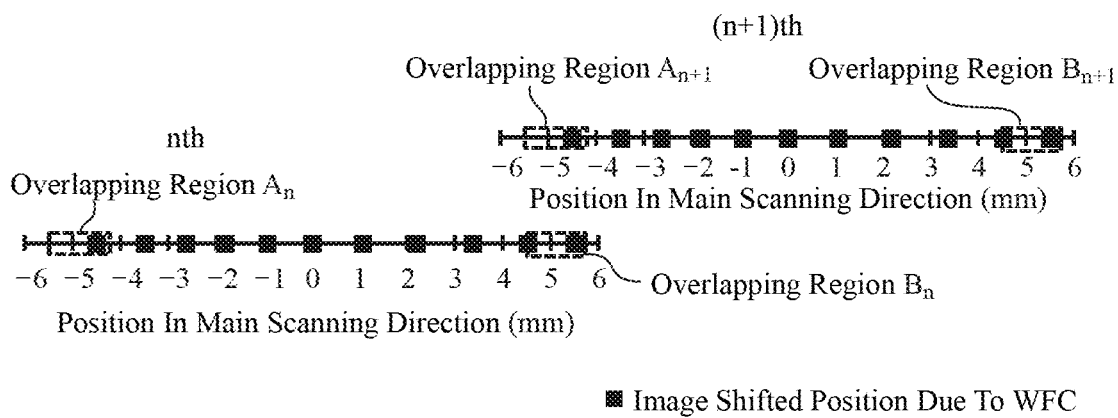
FIG. 16 is a schematic diagram showing how an image formed by an nth image-forming optical element 15 overlaps with an image formed by an (n+1)th image-forming optical element 15.

FIG. 16 is a schematic diagram showing how an image formed by an nth image-forming optical element 15 overlaps an image formed by an (n+1)th image-forming optical element 15.

In an example of FIG. 16, overlapping is performed by correlating images between an overlapping region $B_n$, located at the right edge of an nth image and an overlapping region $A_{n+1}$ located at the left edge of an (n+1)th image, but since the two images have different transfer magnifications, it is difficult to perform overlapping.

However, when the lenses 20 are arranged as shown in FIG. 14D, in all overlapping regions, the transfer magnification matches between adjacent images.

Hence, when the lenses 20 are arranged as shown in FIG. 14D, by performing the same overlapping processing as that of the Embodiment 1 above, an excellent image whose axial chromatic aberration is corrected can be obtained.

Embodiment 3

Embodiment 2 above shows an example in which an excellent image whose axial chromatic aberration is corrected is obtained by arranging the lenses 20 as shown in FIG. 14D.

This Embodiment 3 describes an example in which an excellent image whose axial chromatic aberration is corrected is obtained by eliminating asymmetric distortion in the overlapping regions 32a, 32b . . . which are both edge portions of the field-of-view regions 31a, 31b, 31c, 31d i.e., left-right asymmetric distortion such as that shown in FIG. 15.

The image processor 60 performs distortion correction (hereinafter, referred to as "distortion correction") on a plurality of images having left-right asymmetric distortion as shown in FIG. 15, i.e., a plurality of reduced, transferred images outputted from the imaging elements 25, respectively, before performing an image combining process for overlapping a plurality of images. The distortion correction itself is a publicly known technique and thus a detailed description thereof is omitted.

By the image processor 60 performing distortion correction, distortion in the overlapping regions 32a, 32b . . . which is included in reduced, transferred images outputted from the imaging elements 25 is compensated for.

By this, there is no more difference in transfer magnification between, for example, the overlapping region $B_n$ located at the right edge of the nth reduced, transferred image (image) and the overlapping region $A_{n+1}$ located at the left edge of the (n+1)th reduced, transferred image (image) shown in FIG. 16.

The image processor 60 performs distortion correction on a plurality of reduced, transferred images outputted from the imaging elements 25, respectively, and then performs an image combining process for overlapping the reduced, transferred images having been subjected to the distortion correction.

Since there is no more difference in transfer magnification between, for example, the overlapping region $B_n$ and the overlapping region $A_{n+1}$, an excellent image whose axial chromatic aberration is corrected can be obtained.

Embodiment 4

A plurality of reduced, transferred images (images) read by the imaging elements 25, respectively, include images in which vignetting has occurred by the lenses 18.

Embodiment 4 describes an example in which the image processor 60 performs an image combining process using images in regions in which vignetting has occurred.

Figure 17:
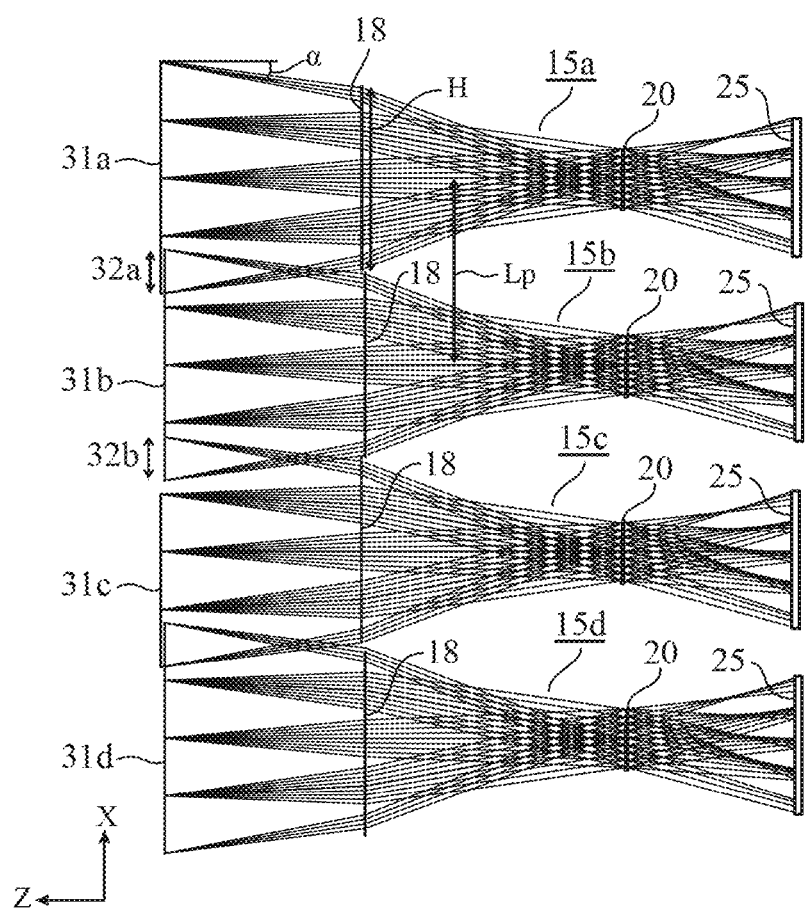
FIG. 17 is a cross-sectional view describing the features of an image reading apparatus in accordance with Embodiment 4 of this application.

FIG. 17 is a cross-sectional view describing the features of an image reading apparatus in accordance with Embodiment 4 of this disclosure, and in FIG. 17 the same reference signs as those of FIG. 1 indicate the same or corresponding portions.

An example is shown in which the number of image-forming optical elements 15 of FIG. 17 is four as in FIG. 1. In FIG. 17, for convenience of description, the four image-forming optical elements 15 are distinguished as an image-forming optical element 15a, an image-forming optical element 15b, an image-forming optical element 15c, and an image-forming optical element 15d.

In addition, in FIG. 17, for simplification of the drawing, the lenses 18 and lenses 20 included in the image-forming optical elements 15a to 15d are represented by line segments, as lenses with no thickness.

As in Embodiment 1 above, the phase modulating elements 20c are placed on the first lens surfaces 20a of the lenses 20.

Although in FIG. 17 the image-forming optical elements 15a to 15d are purposely depicted such that they are shifted relative to each other in the Z-direction so that overlapping between the field-of-view regions 31a, 31b, 31c, and 31d of the respective image-forming optical elements 15a to 15d can be seen, in practice, there is no shift in the Z-direction.

In FIG. 17, the arrangement pitches between the image-forming optical elements 15a to 15d are Lp.

In Embodiment 4, when the image processor 60 performs an image combining process for, for example, a reduced, transferred image outputted from an imaging element 25 provided for the image-forming optical element 15a and a reduced, transferred image outputted from an imaging element 25 provided for the image-forming optical element 15b, the image processor 60 compares the degrees of matching between an image in an overlapping region of the reduced, transferred image for the image-forming optical element 15a and an image in an overlapping region of the reduced, transferred image for the image-forming optical element 15b. Hence, the overlapping regions require a range of a minimum number of pixels or more, e.g., 10 pixels or more.

First, in Embodiment 4, the reason that the image processor 60 performs an image combining process using images in regions in which vignetting has occurred will be described.

In an image reading apparatus in which the image-forming optical elements 15a to 15d are arranged in a line in the X-direction and the entire image is reconstructed by performing an image combining process for a plurality of reduced, transferred images which are read by the imaging elements 25 provided for the image-forming optical elements 15a to 15d, the image-forming optical elements 15a to 15d need to be optical systems close to telecentric on the side of the reading object 1.

Namely, an angle α shown in FIG. 17, i.e., α which is an angle formed by the Z-direction which is an optical axis and an outermost ray, needs to be small.

Note, however, that because the outermost ray is a bundle of rays, strictly speaking, an angle formed by an angle of a ray running at the center of an outermost bundle of rays (hereinafter, referred to as "outermost principal ray") and the optical axis is defined as the angle α.

Figure 18:
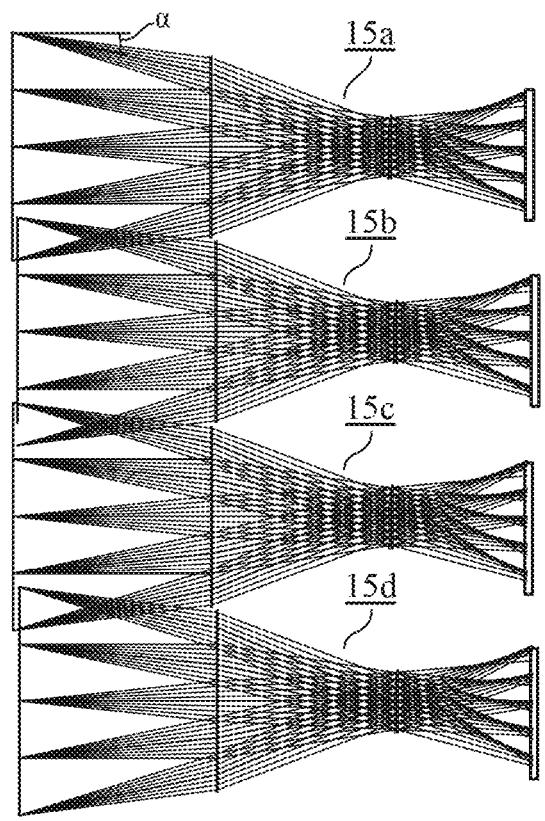
FIG. 18 is a cross-sectional view showing an example which is designed so as not to cause vignetting, with the same field-of-view regions as those of FIG. 17 secured, in a system in which the image-forming optical elements 15$a$ to 15$d$ are arranged in a line in the X-direction.

FIG. 18 is a cross-sectional view showing an example which is designed so as not to cause vignetting, with the same field-of-view regions as those of FIG. 17 secured, in a system in which the image-forming optical elements 15a to 15d are arranged in a line in the X-direction.

The arrangement pitches between the image-forming optical elements 15a to 15d of FIG. 18 are Lp which is the same as that of FIG. 17.

The lenses 18 included in the image-forming optical elements 15a to 15d of FIG. 18 are arranged in a line in the X-direction, and thus, the aperture width H in the X-direction of the lenses 18 is less than or equal to Lp.

When, under these conditions, the lenses 18 are designed so as not to cause vignetting, as shown in FIG. 18, α which is the angle formed by the optical axis and the outermost principal ray is larger than that of the image reading apparatus of FIG. 17 in which vignetting occurs.

Hence, the image-forming optical elements 15a to 15d of FIG. 18 are not optical systems close to telecentric, compared to the image-forming optical elements 15a to 15d of FIG. 17.

In the case of non-telecentric optical systems, the transfer magnification of an image greatly changes by a slight change in the distance to document.

Figure 19:
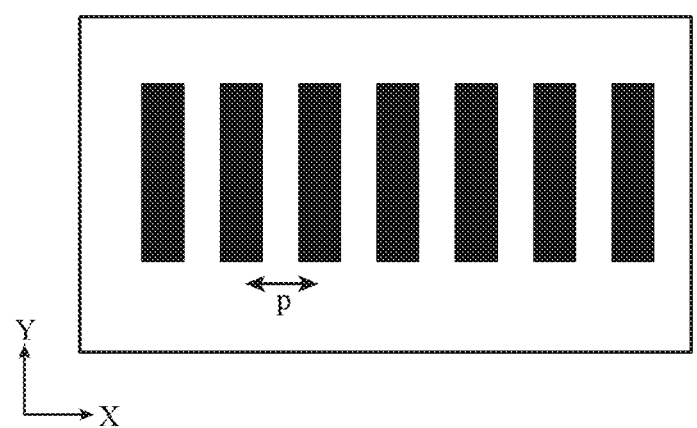
FIG. 19 is an illustrative diagram showing a document image in which straight lines are arranged in pitches p in the main scanning direction.

For example, it is assumed that, as shown in FIG. 19, a document image in which straight lines extending in the Y-direction, which is the sub-scanning direction, are repeatedly arranged in pitches p in the X-direction, which is the main scanning direction, is present in an overlapping region. In addition, it is also assumed that the image reading apparatus has a resolution at a spatial frequency (1/p).

FIG. 19 is an illustrative diagram showing the document image in which the straight lines are arranged in the pitches p in the main scanning direction.

Figure 20:
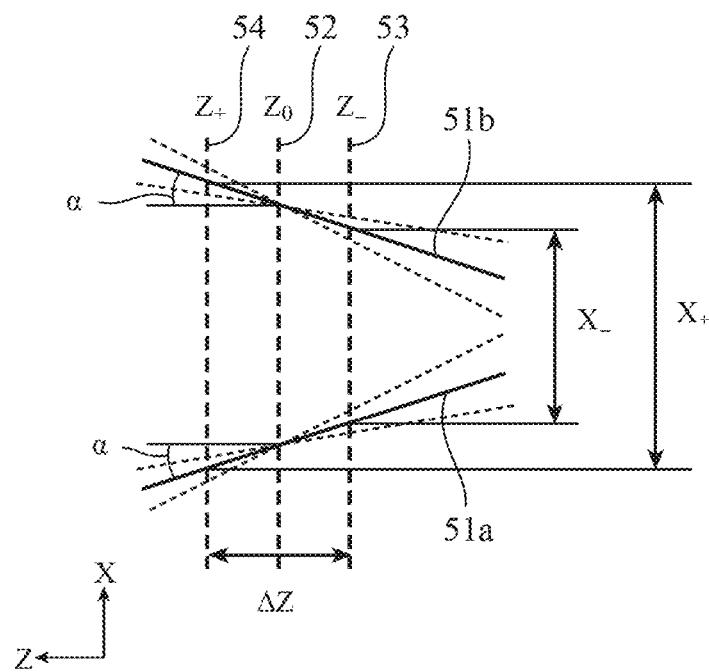
FIG. 20 is a schematic diagram showing behavior of rays at or near an overlapping region 32$a$ on the reading object 1 side.

FIG. 20 is a schematic diagram showing a state of rays at or near the overlapping region 32a on the side of the reading object 1.

In FIG. 20, an outermost principal ray on the −X side 51a of the image-forming optical element 15a and an outermost principal ray on the +X side 51b of the image-forming optical element 15b are depicted such that they are extended in the +Z-direction.

In FIG. 20, for the position $Z=Z_0$ which is a focus position 52 on the side of the reading object 1, a desired depth of field is ΔZ, a farthest object position 54 in the depth of field is $Z=Z_+$, and a nearest object position 53 in the depth of field is $Z=Z_-$.

Since the image-forming optical elements 15a to 15d of FIG. 18 cannot be called optical systems close to telecentric, a field-of-view region changes between the position $Z_+$ and the position $Z_-$ depending on the angle α formed by the optical axis and the outermost principal ray.

The overlapping region 32a in which the field-of-view region 31a of the image-forming optical element 15a overlaps the field-of-view region 31b of the image-forming optical element 15b has a width of $X_+$ in the position $Z_+$, and has a width of $X_-$ in the position $Z_-$.

Hence, the overlapping region 32a changes by ΔX in the depth of field, as shown in Equation (6) below:

$$\Delta X = X_+ - X_- \quad (6)$$

The amount of change ΔX of the overlapping region 32a shown in Eq. (6) can also be represented as shown in Equation (7) below:

$$\Delta X = 2 \cdot \Delta Z \cdot \tan \alpha \quad (7)$$

$$\Delta Z = Z_+ - Z_- \quad (8)$$

If the amount of change ΔX of the overlapping region 32a exceeds the pitch p shown in FIG. 19, then when the image processor 60 performs an image combining process, two reduced, transferred images may be combined with the images shifted by the pitch p.

When two reduced, transferred images are combined with the images shifted by the pitch p, the two reduced, transferred images are discontinuous at a boundary region thereof, significantly degrading image quality.

When, as shown in Inequality (9), the amount of change ΔX of the overlapping region 32a is smaller than the pitch p, Inequality (10) below holds true:

$$\Delta X < p \quad (9)$$

$$\tan \alpha < p/(2 \cdot \Delta Z) \quad (10)$$

To satisfy Ineq. (10), it is desirable that the angle α be a small value.

Note, however, that in practice, even if Ineq. (10) is not satisfied, an image combining process can be performed by taking into account not only an image in the overlapping region 32a of interest, but also an image in a region around the overlapping region 32a. Even in that case, it is desirable that the angle α be as small as possible because the number of candidates for an image combining position can be reduced.

To reduce the angle α, in an area at or near the edge of a field-of-view region of an image-forming optical element 15, there is a need to obtain an image in a region in which vignetting has occurred and use the image in the region in an image combining process.

Next, an image combining process using an image in a region in which vignetting has occurred will be described.

FIG. 21 is illustrative diagrams showing changes in spot diagrams due to vignetting in the lens 18.

Figure 21A:
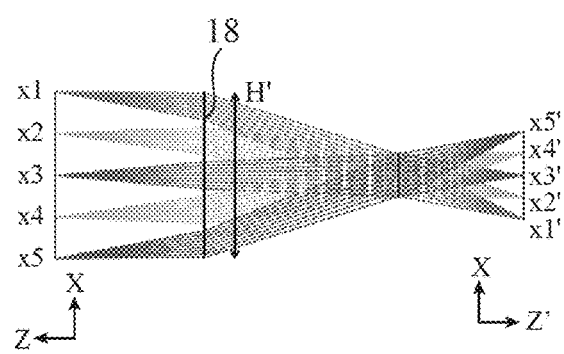
FIG. 21A is a ray tracing diagram for a case in which there is no vignetting and there is no phase modulating element 20$c$ for the WFC.
Figure 21B:
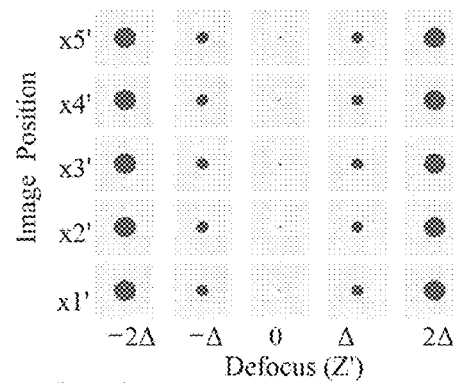
FIG. 21B is an illustrative diagram showing spot diagrams at an image-forming surface for the case of FIG. 21A.

FIG. 21A is a ray tracing diagram for a case in which there is no vignetting and there is no phase modulating element 20c for the WFC, and FIG. 21B shows spot diagrams at the image-forming surface for the case of FIG. 21A. The aperture width in the X-direction of the lens 18 of FIG. 21A is H'.

FIG. 21B shows, as spot diagrams at the image-forming surface, spot diagrams for a just focused position Z'=0, and also spot diagrams for defocused positions shifted by ±Δ in a Z' direction from the just focused position, and spot diagrams for defocused positions shifted by ±2Δ. On the image-forming surface side, a direction going away from the lens 18 is defined as +Z'.

Figure 21C:
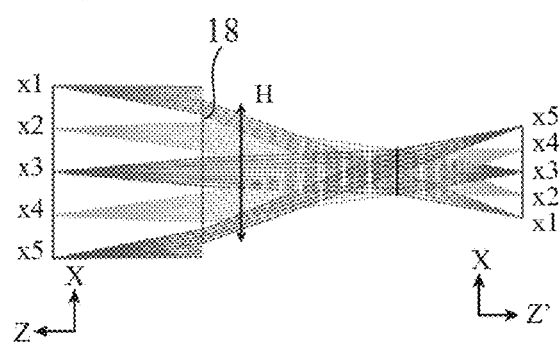
FIG. 21C is a ray tracing diagram for a case in which the aperture width in the X-direction of a lens 18 is reduced to H from H' to cause vignetting.
Figure 21D:
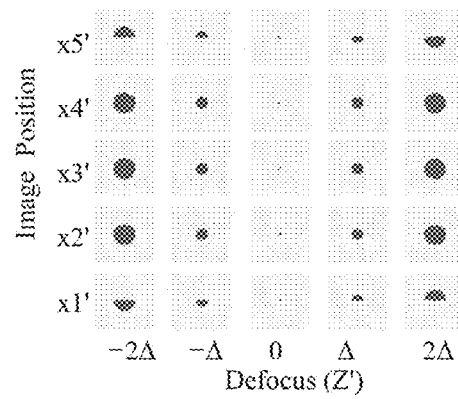
FIG. 21D is an illustrative diagram showing spot diagrams at the image-forming surface for the case of FIG. 21C.

FIG. 21C is a ray tracing diagram for a case in which the aperture width in the X-direction of the lens 18 is reduced to H from H' to cause vignetting, and FIG. 21D shows spot diagrams at the image-forming surface for the case of FIG. 21C.

In spot diagrams for x1' and x5' with vignetting, an inner region is lost upon negative-side defocusing, and an outer region is lost upon positive-side defocusing.

In addition, in the case of FIG. 21C, because there is no asymmetry in the X-direction, the spot diagrams for x1' and the spot diagrams for x5' have shapes that are just reversed from each other with respect to the X-direction.

Figure 21E:
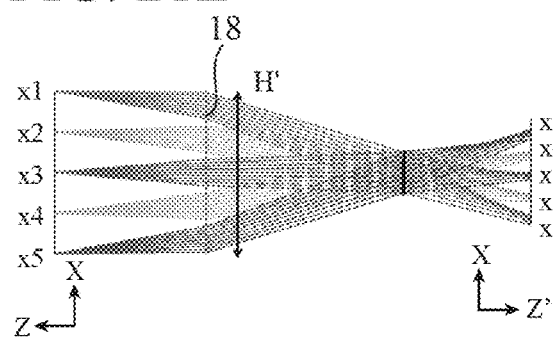
FIG. 21E is a ray tracing diagram for a case in which there is no vignetting and there is a phase modulating element 20$c$ for the WFC.
Figure 21F:
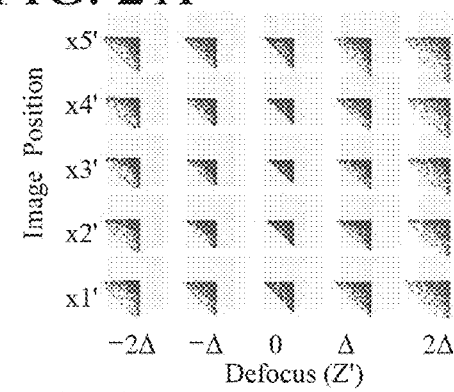
FIG. 21F is an illustrative diagram showing spot diagrams at the image-forming surface for the case of FIG. 21E.

FIG. 21E is a ray tracing diagram for a case in which there is no vignetting and there is a phase modulating element 20c for the WFC, and FIG. 21F shows spot diagrams at the image-forming surface for the case of FIG. 21E.

In FIG. 21B, the spot diameter greatly changes for defocusing, whereas in FIG. 21F, the spot diameter does not change almost at all for defocusing. This is the same advantageous effect as that described in FIG. 7. In addition, it can also be seen that since there is no vignetting in the field-of-view region, the spot diameter is almost the same regardless of x1' to x5'.

Figure 21G:
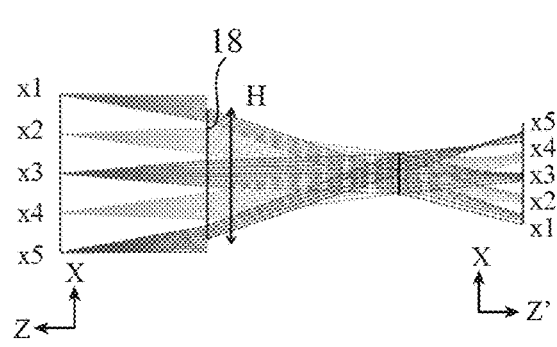
FIG. 21G is a ray tracing diagram for a case in which there is vignetting and there is a phase modulating element 20$c$ for the WFC.
Figure 21H:
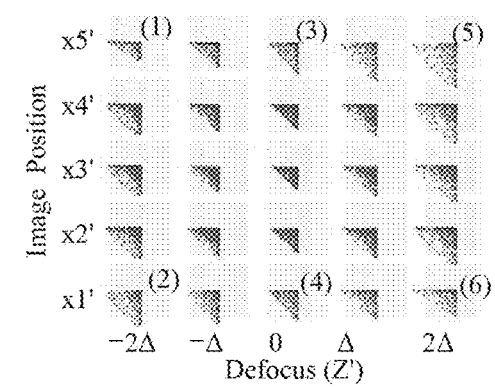
FIG. 21H is an illustrative diagram showing spot diagrams at the image-forming surface for the case of FIG. 21G.

FIG. 21G is a ray tracing diagram for a case in which there is vignetting and there is a phase modulating element 20c for the WFC, and FIG. 21H shows spot diagrams at the image-forming surface for the case of FIG. 21G.

In FIG. 21G, the width of a reading region is the same as that of FIG. 21E, and the aperture width in the X-direction of the lens 18 is H and is smaller than the aperture width H' in the X-direction of the lens 18 of FIG. 21E.

In FIG. 21H, particular attention should be paid to spot diagrams with vignetting and for defocused positions, which are spot diagrams (1), (2), (5), and (6) in the drawing.

In FIG. 21G, as in FIG. 21C, vignetting occurs in bundles of rays located on the outer side of the lens 18 among the outermost bundles of rays.

Then, at the defocused position Z'=-2Δ, as in FIG. 21D, an inner ray of light is vignetted. However, since a spot diagram is greatly and asymmetrically distorted by the phase modulating element 20c, the spot shape greatly differs between (1) and (2). In (1), as in FIG. 21D, the shape is such that the inside is greatly vignetted, but in (2) there is almost no change in spot shape caused by vignetting.

In addition, in the defocused position Z'=2Δ, there is almost no change in spot shape of (5), and the spot shape of (6) is greatly lost outward.

FIG. 22 illustrates diagrams showing distortion which occurs as image distortion.

Figure 22A:
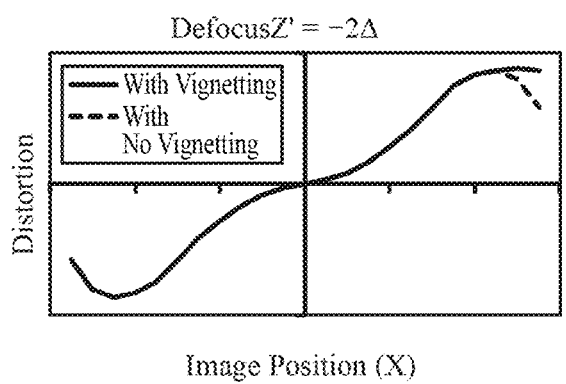
FIG. 22A is an illustrative diagram showing distortion for the amount of defocus $Z'=-2\Delta$.

FIG. 22A shows distortion for the amount of defocus Z'=-2Δ.

A dashed line is distortion with no vignetting and corresponds to FIGS. 21E and 21F.

A solid line is distortion with vignetting and corresponds to FIGS. 21G and 21H.

In a spot of (1) of FIG. 21H, since the inside is vignetted, the luminance centroid position of the spot is shifted outward. Thus, in a solid-line graph of FIG. 22A, the value of distortion increases near the +X end in the image position.

Figure 22B:
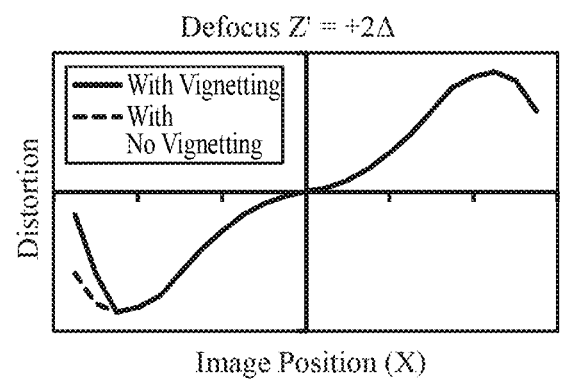
FIG. 22B is an illustrative diagram showing distortion for the amount of defocus $Z'=+2\Delta$.

FIG. 22B shows distortion for the amount of defocus Z'=+2Δ, and since, as shown in FIG. 21H, an outer spot is vignetted, the value of distortion increases in a positive direction at the -X end in the image position in a solid-line graph.

When irregular distortion occurs near an edge of a field-of-view region, a problem occurs in combining of a plurality of images.

For example, it is assumed that defocus $Z=-2\Delta M^2$ has occurred in the overlapping region 32a which is present at a boundary portion between the image-forming optical element 15a and the image-forming optical element 15b shown in FIG. 17.

M is the transfer magnification of images obtained by the image-forming optical elements 15a and 15b, and the longitudinal magnification in a focus direction is $M^2$.

Spot diagrams on the image-forming surface side correspond to spot diagrams for defocus Z'=-2Δ in FIG. 21H. Thus, when defocus $Z=-2\Delta M^2$ has occurred on the side of the reading object 1, graphs of distortion with the position of the side of the reading object 1 on the horizontal axis are as shown in FIGS. 23A and 23B.

The reason that FIGS. 23A and 23B are left-right reversed from FIG. 22A is because the images obtained by the image-forming optical elements 15 are reversed.

FIG. 23A shows distortion in the field-of-view region 31b, and FIG. 23B shows distortion in the field-of-view region 31a. At this time, the overlapping region 32a is at the right end of the graph of FIG. 23A and is at the left end of the graph of FIG. 23B.

In addition, when defocus $Z=+2\Delta M^2$ has occurred on the side of the reading object 1, graphs of distortion with the position of the side of the reading object 1 on the horizontal axis are as shown in FIGS. 23C and 23D.

The reason that FIGS. 23C and 23D are left-right reversed from FIG. 22B is because the images obtained by the image-forming optical elements 15 are reversed.

FIG. 23C shows distortion in the field-of-view region 31b, and FIG. 23D shows distortion in the field-of-view region 31a. At this time, the overlapping region 32a is at the right end of the graph of FIG. 23C and is at the left end of the graph of FIG. 23D.

When the amount of defocus on the side of the reading object 1 changes due to the presence of vignetting, as shown in FIGS. 23A, 23B, 23C, and 23D, the distortion value in the overlapping region 32a greatly changes.

In two images that are more greatly distorted due to the occurrence of vignetting, because their distortion values greatly differ from each other, it is highly likely that the two images are combined at a wrong position, and thus, it is difficult to properly perform an image combining process.

Hence, in Embodiment 4, the image processor 60 performs distortion correction on the respective reduced, transferred images outputted from the imaging elements 25 before performing an image combining process.

As can be seen from FIG. 22, the distortion changes by the amount of defocus. If the amount of defocus is known by some kind of means, then distortion is uniquely determined from the amount of defocus, and thus, correction of the distortion is performed.

For example, the amount of defocus can be known from the results of an image combining process.

As can be understood from Eq. (7), the amount of change ΔX of an overlapping region which is distortion changes in proportion to the amount of defocus ΔZ.

Hence, the image processor 60 first performs an image combining process without performing distortion correction, and thereby calculates the amount of defocus ΔZ. Here, since distortion correction is not performed, an image combining process may not be able to be properly performed, but it is possible to calculate a rough amount of defocus ΔZ.

Then, the image processor 60 estimates, using, for example, Eq. (7), the amount of change ΔX of an overlapping region from the calculated amount of defocus ΔZ, and performs distortion correction based on the amount of change ΔX.

The distortion correction is image processing for locally stretching or shrinking an image in accordance with the position X, wherein a region (image) where ΔX is positive is corrected to be reduced in the X-direction, while a region (image) where ΔX is negative is corrected to be enlarged in the X-direction.

Finally, the image processor 60 performs an image combining process for a plurality of reduced, transferred images having been subjected to the distortion correction.

By this, an excellent image can be reconstructed.

Here, the image processor 60 performs an image combining process for a plurality of reduced, transferred images having been subjected to distortion correction, but the image processor 60 may further perform a filtering process for reconstructing an image whose resolution is degraded due to modulation of the light by using the phase modulating elements 20c.

A specific description is as follows.

In a region in which vignetting has occurred, as shown in FIG. 21H, the shape of the PSF greatly differs from that in a region in which vignetting has not occurred. Hence, a method is considered in which an image in a region in which vignetting has occurred is used only in a process of searching for a matching position in an image combining process, and is not used in a final combining image process.

However, when a region in which vignetting has occurred occupies a large portion of an overlapping region, unless an image in the region in which vignetting has occurred is also used in a final combining image process, an excellent image may not be able to be reconstructed.

Note, however, that a reconstructing process in the WFC greatly depends on the shape of the PSF. Hence, different filters are used in a filtering process for regions at and near both edges of an image and in a filtering process for a region at and near the center of the image.

For example, a filter used in a filtering process for regions such as (1) and (6) of FIG. 21H is different from a filter used in a filtering process for regions such as (3) and (4) of FIG. 21H.

As described above, since the amount of defocus can be known from the results of an image combining process, the shape of a spot resulting from vignetting can be calculated using the amount of defocus.

Hence, the image processor 60 selects a filter to be used in a filtering process, based on the shape of a spot.

A filtering process in a reconstructing process in the WFC here is to perform a process using a deconvolution filter, a filtering function is changed in accordance with an image height position X' and the amount of defocus Z of an object. As described in Section [0016] of Patent Literature 3, when the function of an obtained image is g(x, y), the PSF function is h(x, y), and the function of an original image is f(x, y), the function of an obtained image can be represented as shown in the following equation (11):

$$g(x,y)=h(x,y)*f(x,y) \quad (11)$$

In Eq. (11), * is the symbol representing convolution.

When both sides of Eq. (11) are Fourier-transformed, Eq. (11) is represented by the product of Fourier transforms as shown in Equation (12) below:

$$G(\xi,\eta)=H(\xi,\eta)\cdot F(\xi,\eta) \quad (12)$$

In Eq. (12), G(ξ, η), H(ξ, η), and F(ξ, η) are the Fourier transformed functions of g(x, y), h(x, y), and f(x, y), respectively.

Thus, a reconstructing process in the WFC for reconstructing the original image function f(x) is to find f(x, y) by computing $$F(\xi,\eta)=G(\xi,\eta)/H(\xi,\eta)$$

and further performing an inverse Fourier transform.

In Embodiment 4, the PSF function h(x, y) is not always constant, and different functions are used based on the image height position X' and the amount of defocus Z of an object. The function may be continuously changed based on the image height position X' and the amount of defocus Z of an object, but for simplification of a process, it is practical to divide a region into several regions and change the function for each region. For example, in FIG. 21H, only for the regions of (1) and (6) which are regions in which there is large vignetting and spot diagrams are largely lost, h(x, y) based on their respective spot diagrams is used, and for other regions, because spot diagrams are substantially common, common h(x, y) based on the spot diagrams can be used.

According to Embodiment 4, by performing left-right asymmetric distortion correction on an image in a region in which vignetting has occurred, the image in the region in which vignetting has occurred can also be used in an image combining process. Hence, an advantageous effect can be obtained that even with the angle α formed by an optical axis and an outermost ray of light being small, the image-forming optical elements 15a, 15b, 15c, and 15d are arranged in a line and sufficient overlapping regions for an image combining process can be obtained for the respective field-of-view regions.

In addition, since a filtering process that uses different filters in accordance with a change in the shape of a spot caused by vignetting is performed, a more excellent image can be reconstructed.

Note that a free combination of the embodiments, modifications to any component in the embodiments, or omissions of any component in the embodiments are possible within the scope of the invention.

INDUSTRIAL APPLICABILITY

Disclosed embodiments are suitable for use as an image reading apparatus for reading an image of a reading object.

REFERENCE SIGNS LIST

1: Reading object, 11: Top glass, 12: Light emitting unit, 13: Light, 14: Image-forming system array, 15, 15a, 15b, 15c, and 15d: Image-forming optical element, 16 and 17: Light, 18: Lens, 19: Aperture stop, 20: Lens, 20a: First lens surface, 20b: Second lens surface, 20c: Phase modulating element, 21: Light, 22: Image-forming surface, 23 and 24: Holder, 25: Imaging element, 31a, 31b, 31c, and 31d: Field-of-view region, 32a and 32b: Overlapping region, 40:

Global coordinates, 41*a*, 41*b*, 41*c*, 41*d*, 41*e*, and 41*f*: Local coordinates of phase superposition plane, 50: Fitting portion, 51*a*: Outermost principal ray on the −X side, 15*b*: Outermost principal ray on the +X side, 52: Focus position on the reading object side, 53: Nearest object position in the depth of field, 54: Farthest object position in the depth of field, and 60: Image processor.

The invention claimed is:

1. An image reading apparatus comprising:
   image-forming optical elements arranged in a straight line, each image-forming optical element for collecting light scattered by a reading object and capturing the collected light on an image-forming surface, and thereby forming an image of the reading object on the image-forming surface; and
   imaging elements, disposed on the image-forming surface, for reading respective images formed by the image-forming optical elements, wherein
   the image-forming optical elements are disposed such that a part of a field-of-view region of one image-forming optical element overlaps a part of a field-of-view region of an image-forming optical element disposed adjacent to the one image-forming optical element, the field-of-view region being a region in which the light scattered by the reading object is collected,
   each image-forming optical element includes:
      a lens for capturing the light scattered by the reading object on the image-forming surface;
      an aperture stop for cutting off part of light passing through the lens; and
      a phase modulating element for modulating phase of light passing through the aperture stop, the phase modulating element having resolution characteristics that depend on an angle around an optical axis, and
   the phase modulating elements are loaded such that resolution characteristics of the phase modulating elements in an arrangement direction of the image-forming optical elements are same among the image-forming optical elements.

2. The image reading apparatus according to claim 1, wherein the lens includes a first lens for collecting the light scattered by the reading object, and a second lens for capturing the light whose phase is modulated by the phase modulating element on the image-forming surface.

3. The image reading apparatus according to claim 2, wherein
   the second lens has a first lens surface provided so as to face the aperture stop, and a second lens surface provided so as to face the image-forming a surface, and
   the phase modulating element is placed on the first lens surface.

4. The image reading apparatus according to claim 3, wherein a cut is made in a part of each of the lenses having the phase modulating elements placed on the first lens surfaces.

5. The image reading apparatus according to claim 1, wherein loading angles around the optical axes of the phase modulating elements are set to be a same angle in a same plane, the phase modulating elements being included in the image-forming optical elements.

6. The image reading apparatus according to claim 1, wherein a phase $\phi(X, Y)$ modulated by each of the phase modulating elements included in the image-forming optical elements is represented by a function $a(X^3 + Y^3)$ based on a constant a, a position X in a main scanning direction, and a position Y in a sub-scanning direction.

7. The image reading apparatus according to claim 1, wherein a difference between loading angles around the optical axes in a same plane of the phase modulating elements included in the image-forming optical elements is an integer multiple of 90 degrees.

8. The image reading apparatus according to claim 7, wherein
   as the phase modulating elements included in the image-forming optical elements, a first phase modulating element whose loading angle around an optical axis has a first direction and a second phase modulating element whose loading angle around an optical axis has a second direction are alternately disposed, and
   a direction of a first coordinate axis for the second direction is a direction rotated by -90 degrees with respect to a first coordinate axis for the first direction, and a direction of a second coordinate axis for the second direction is a direction rotated by +90 degrees with respect to a second coordinate axis for the first direction.

9. The image reading apparatus according to claim 1, wherein a cut is made in a part of each of the phase modulating elements included in the image-forming optical elements.

10. The image reading apparatus according to claim 1, comprising an image processor for performing an image combining process for overlapping the images respectively read by the imaging elements.

11. The image reading apparatus according to claim 10, wherein
   the images respectively read by the imaging elements are images in which both edge portions of each of the field-of-view regions are asymmetrically distorted, and
   the image processor performs a correction process for correcting the distortion of the images respectively read by the imaging elements, and then performs the image combining process.

12. The image reading apparatus according to claim 11, wherein
   the images respectively read by the imaging elements include an image with vignetting caused by a corresponding one of the lenses, and
   the image processor performs the correction process by using the image in a region with vignetting.

13. The image reading apparatus according to claim 10, wherein
   the images respectively read by the imaging elements include an image with vignetting caused by a corresponding one of the lenses,
   the image processor performs a filtering process for reconstructing an image whose resolution is degraded due to modulation of phase of light performed by a corresponding one of the phase modulating elements, and
   a filter used to perform the filtering process is different for different positions of images whose resolution is degraded.

* * * * *